United States Patent
Battaje et al.

(10) Patent No.: US 10,809,928 B2
(45) Date of Patent: Oct. 20, 2020

(54) EFFICIENT DATA DEDUPLICATION LEVERAGING SEQUENTIAL CHUNKS OR AUXILIARY DATABASES

(71) Applicant: Western Digital Technologies, Inc., San Jose, CA (US)

(72) Inventors: Ajith Kumar Battaje, Karnataka (IN); Tanay Goel, Chhattisgarh (IN); Kiran Shivanagoudar, San Jose, CA (US); Saurabh Manchanda, Banglaore (IN); Ashwin Narasimha, Los Altos, CA (US); Ashish Singhai, Los Altos, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 323 days.

(21) Appl. No.: 15/613,012

(22) Filed: Jun. 2, 2017

(65) Prior Publication Data
US 2018/0349053 A1    Dec. 6, 2018

(51) Int. Cl.
*G06F 3/06*     (2006.01)
*G06F 12/0891*  (2016.01)

(52) U.S. Cl.
CPC ............ *G06F 3/0641* (2013.01); *G06F 3/067* (2013.01); *G06F 3/0608* (2013.01);
(Continued)

(58) Field of Classification Search
CPC ...... G06F 3/0608; G06F 3/0641; G06F 3/067; G06F 3/0679; G06F 12/0811;
(Continued)

(56) References Cited

U.S. PATENT DOCUMENTS 6,374,250 B2   4/2002   Ajtai et al.
7,110,407 B1   9/2006   Khanna
(Continued)

FOREIGN PATENT DOCUMENTS

JP   2010218194 A    9/2010
JP   2013541083 A   11/2013
WO   2012031047 A1   3/2012

OTHER PUBLICATIONS

L. Song, Y. Deng and J. Xie, "Exploiting Fingerprint Prefetching to Improve the Performance of Data Deduplication," 2013 IEEE 10th International Conference on High Performance Computing and Communications & 2013 IEEE International Conference on Embedded and Ubiquitous Computing, Zhangjiajie (Year: 2013).*
(Continued)

*Primary Examiner* — Reginald G Bragdon
*Assistant Examiner* — Aaron D Ho
(74) *Attorney, Agent, or Firm* — Loza & Loza, LLP; Gabriel Fitch

(57) ABSTRACT

Various aspects for data deduplication in a storage system are provided. For instance, a storage controller may perform operations including receiving a data chunk including a set of data blocks, determining a signature for the data chunk, and comparing the signature and a set of reference signatures to determine a match. Responsive to a match, the operations may further include identifying a reference data chunk including a set of comparison blocks associated with the matched reference signature, performing a deduplication technique on the set of data blocks based on the set of comparison blocks, and identifying a subsequent reference data chunk for an estimated next data chunk based on identification of the reference data chunk and prior to receipt of the next data chunk.

21 Claims, 8 Drawing Sheets

(52) U.S. Cl.
CPC ........ *G06F 3/0679* (2013.01); *G06F 12/0891* (2013.01); *G06F 2212/222* (2013.01)

(58) Field of Classification Search
CPC .. G06F 12/0891; G06F 12/0897; G06F 12/12; G06F 2212/222
USPC ........................................................ 711/133
See application file for complete search history.

(56) References Cited

U.S. PATENT DOCUMENTS

| | | | |
|---|---|---|---|
| 7,523,098 B2 | 4/2009 | Hirsch et al. | |
| 7,567,188 B1 | 7/2009 | Anglin et al. | |
| 7,636,745 B1 | 12/2009 | Detlefs | |
| 7,774,556 B2 | 8/2010 | Karamcheti | |
| 7,822,758 B1 | 10/2010 | Prakash | |
| 8,065,268 B1 | 11/2011 | Ghemawat | |
| 8,082,231 B1 | 12/2011 | McDaniel et al. | |
| 8,099,571 B1 | 1/2012 | Driscoll | |
| 8,135,683 B2 | 3/2012 | Douglis et al. | |
| 8,156,306 B1 | 4/2012 | Raizen et al. | |
| 8,195,636 B2 | 6/2012 | Stager et al. | |
| 8,244,691 B1 | 8/2012 | Ramarao | |
| 8,250,325 B2 | 8/2012 | Holdman et al. | |
| 8,260,752 B1 | 9/2012 | Stringham et al. | |
| 8,280,926 B2 | 10/2012 | Sandorfi et al. | |
| 8,364,652 B2 | 1/2013 | Vijayan et al. | |
| 8,370,305 B2 | 2/2013 | Petrocelli | |
| 8,392,376 B2 | 3/2013 | Guo | |
| 8,392,384 B1 | 3/2013 | Wu et al. | |
| 8,442,942 B2 * | 5/2013 | Leppard | G06F 16/1752 707/616 |
| 8,463,825 B1 | 6/2013 | Harty | |
| 8,489,611 B2 | 7/2013 | Tofano | |
| 8,495,028 B2 | 7/2013 | Reiter et al. | |
| 8,504,533 B2 | 8/2013 | Dewey et al. | |
| 8,527,544 B1 | 9/2013 | Colgrove | |
| 8,631,052 B1 | 1/2014 | Shilane et al. | |
| 8,667,032 B1 | 3/2014 | Shilane et al. | |
| 8,712,978 B1 | 4/2014 | Shilane et al. | |
| 8,725,705 B2 | 5/2014 | Hirsch et al. | |
| 8,751,462 B2 | 6/2014 | Huang et al. | |
| 8,874,532 B2 | 10/2014 | Anglin et al. | |
| 8,898,120 B1 | 11/2014 | Efstathopoulos | |
| 8,898,410 B1 | 11/2014 | Ehrenberg | |
| 8,914,338 B1 | 12/2014 | Wallace et al. | |
| 8,918,390 B1 | 12/2014 | Shilane et al. | |
| 8,954,398 B1 | 2/2015 | Zhang et al. | |
| 8,972,672 B1 | 3/2015 | Wallace et al. | |
| 9,021,203 B2 | 4/2015 | Hyde, II et al. | |
| 9,141,301 B1 | 9/2015 | Wallace et al. | |
| 9,152,335 B2 | 10/2015 | Sundaram et al. | |
| 9,268,783 B1 | 2/2016 | Shilane et al. | |
| 9,298,724 B1 | 3/2016 | Patil et al. | |
| 9,304,914 B1 * | 4/2016 | Douglis | G06F 12/0802 |
| 9,336,143 B1 * | 5/2016 | Wallace | G06F 12/121 |
| 9,390,116 B1 * | 7/2016 | Li | G06F 16/2272 |
| 9,400,610 B1 | 7/2016 | Wallace et al. | |
| 9,413,527 B2 | 8/2016 | Yang et al. | |
| 9,582,421 B1 * | 2/2017 | Agarwala | G06F 12/0253 |
| 10,102,150 B1 * | 10/2018 | Visvanathan | G06F 12/128 |
| 10,135,462 B1 * | 11/2018 | Wallace | G06F 11/1453 |
| 10,175,894 B1 * | 1/2019 | Visvanathan | G06F 3/0619 |
| 2003/0005235 A1 | 1/2003 | Young | |
| 2006/0136365 A1 | 6/2006 | Kedem et al. | |
| 2006/0184505 A1 | 8/2006 | Kedem et al. | |
| 2007/0027867 A1 | 2/2007 | Ichino | |
| 2009/0112880 A1 | 4/2009 | Oliveira et al. | |
| 2009/0171990 A1 | 7/2009 | Naef, III | |
| 2010/0125553 A1 | 5/2010 | Huang et al. | |
| 2010/0281208 A1 | 11/2010 | Yang | |
| 2010/0318759 A1 | 12/2010 | Hamilton et al. | |
| 2011/0066628 A1 * | 3/2011 | Jayaraman | G06F 16/1748 707/758 |
| 2011/0167096 A1 | 7/2011 | Guo | |
| 2011/0176493 A1 | 7/2011 | Kiiskila et al. | |
| 2011/0196829 A1 | 8/2011 | Vickrey et al. | |
| 2011/0225214 A1 | 9/2011 | Guo | |
| 2011/0238635 A1 | 9/2011 | Leopard | |
| 2011/0246741 A1 * | 10/2011 | Raymond | G06F 16/1752 711/170 |
| 2011/0314205 A1 | 12/2011 | Nagata | |
| 2012/0027093 A1 | 2/2012 | Amon et al. | |
| 2012/0059800 A1 | 3/2012 | Guo | |
| 2012/0124105 A1 | 5/2012 | Provenzano | |
| 2012/0137059 A1 | 5/2012 | Yang et al. | |
| 2012/0166401 A1 * | 6/2012 | Li | G06F 16/1748 707/692 |
| 2012/0185612 A1 | 7/2012 | Zhang et al. | |
| 2012/0191670 A1 | 7/2012 | Kennedy | |
| 2012/0191672 A1 | 7/2012 | Jayaraman | |
| 2013/0036289 A1 | 2/2013 | Welnicki et al. | |
| 2013/0041872 A1 | 2/2013 | Aizman et al. | |
| 2013/0054524 A1 | 2/2013 | Anglin et al. | |
| 2013/0073798 A1 | 3/2013 | Kang et al. | |
| 2013/0179407 A1 * | 7/2013 | Stoakes | G06F 16/1752 707/692 |
| 2013/0185259 A1 | 7/2013 | Guo | |
| 2013/0243190 A1 | 9/2013 | Yang et al. | |
| 2013/0262758 A1 | 10/2013 | Smith et al. | |
| 2013/0297569 A1 * | 11/2013 | Hyde, II | G06F 12/0891 707/692 |
| 2013/0297872 A1 | 11/2013 | Hyde, II et al. | |
| 2014/0025770 A1 | 1/2014 | Warfield et al. | |
| 2014/0143288 A1 | 5/2014 | Grunwald et al. | |
| 2014/0172794 A1 | 6/2014 | Bartholoma et al. | |
| 2014/0189279 A1 | 7/2014 | Seo | |
| 2014/0279953 A1 | 9/2014 | Aronovich | |
| 2014/0279956 A1 | 9/2014 | Trimble | |
| 2014/0281167 A1 | 9/2014 | Danilak et al. | |
| 2014/0297779 A1 | 10/2014 | Pack et al. | |
| 2014/0317352 A1 | 10/2014 | Kleen | |
| 2015/0010143 A1 | 1/2015 | Yang | |
| 2015/0019504 A1 | 1/2015 | Aronovich | |
| 2015/0019797 A1 | 1/2015 | Huang et al. | |
| 2015/0019816 A1 | 1/2015 | Akirav et al. | |
| 2015/0074065 A1 | 3/2015 | Christ et al. | |
| 2015/0074318 A1 | 3/2015 | Sanghvi et al. | |
| 2015/0081993 A1 | 3/2015 | Christopher et al. | |
| 2015/0220277 A1 | 8/2015 | Lee et al. | |
| 2015/0261797 A1 | 9/2015 | Alcantara et al. | |
| 2015/0363418 A1 | 12/2015 | Barajas Gonzalez et al. | |
| 2016/0092138 A1 | 3/2016 | Knestele et al. | |
| 2016/0092143 A1 | 3/2016 | Furlong | |
| 2016/0179386 A1 | 6/2016 | Zhang | |
| 2016/0182088 A1 | 6/2016 | Sipos et al. | |
| 2016/0328154 A1 | 11/2016 | Mizushima et al. | |
| 2016/0335024 A1 | 11/2016 | Zhong et al. | |
| 2016/0371267 A1 | 12/2016 | Narasimha et al. | |
| 2016/0371292 A1 | 12/2016 | Narasimha et al. | |
| 2017/0017650 A1 | 1/2017 | Ciabarra, Jr. et al. | |
| 2017/0039219 A1 * | 2/2017 | Acharya | G06F 16/1752 |
| 2017/0123678 A1 * | 5/2017 | Singhai | G06F 3/0608 |
| 2017/0235496 A1 | 8/2017 | Brosch | |
| 2017/0286464 A1 | 10/2017 | Punti | |

OTHER PUBLICATIONS

Yoon et al. "Efficient Deduplication Techniques for Modem Backup Operation", dated Jun. 2011, 1 page, IEEE Transactions on Computers, vol. 60.
Datamartist "Star Schema Part 2-Defining a Reference and Mapping Away Duplicate Records" dated 2010, retrieved from http://www.datamartist.com/resources/datamartist-doc-files/V1_3_Documentation/DM-Using-referenceand-dedupe-Doc.html on Nov. 17, 2015, 4 pages, nModal Solutions Inc.
Xia et al. "SiLo a Similarity-Locality based Near-Exact Deduplication Scheme with Low Ram Overhead and High Throughput" dated 2011, 14 pages.
Moinakg'S Ramblings "The Pseudo Random Bit Bucket—Scaling Deduplication in Pcompress—Petascale in RAM", dated Jun. 15, 2013, retrieved from https://moinakg.wordpress.com/tag/data-

(56) References Cited

OTHER PUBLICATIONS deduplication/ on Nov. 18, 2015, Blog At Wordpress.Com. The Twenty Twelve Theme.
Anonymous "Data Deduplication Background: A Technical White Paper" dated Jul. 2014, 12 pages, White Paper Quantum Technical Bulletin TB00017.
Wikipedia "Logical Block Addressing" dated Dec. 3, 2016, 4 pages.
Jin et al. "The Effectiveness of Deduplication on Virtual Machine Disk Images" dated 2009, 12 pages.
Debnath et al. "ChunkStash: Speeding up Inline Storage Deduplication Using Flash Memory" dated 2010, 15 pages.
Yoon et al. "Efficient Deduplication Techniques for Modem Backup Operation", dated Jun. 2011, 1 p., IEEE Transactions on Computers, vol. 60.
Shilane et al. "Delta Compressed and Deduplicated Storage Using Stream-Informed Locality" dated 2012, 49 pages, EMC Corporation.
Jiang et al. "Combining Deduplication and Delta Compression to Achieve Low-Overhead Data Reduction on Backup Datasets," dated 2014, 1 page, Data Compression Conference, Snowbird, UT 2014.

\* cited by examiner

EFFICIENT DATA DEDUPLICATION LEVERAGING SEQUENTIAL CHUNKS OR AUXILIARY DATABASES

BACKGROUND

Field of the Technology

The present disclosure relates to computing systems and, more particularly, to data deduplication in storage networks and/or storage systems.

Description of Related Art

Various computing networks and systems are capable of storing data. In some previous storage networks and systems, multiple copies of the same data may be stored in the storage network and/or system. While it may be desirable to include a backup copy of some data to prevent data loss, storing multiple copies of the same data throughout a storage network and/or system can be an inefficient use of storage resources. For instance, storing multiple copies of the same data can unnecessarily consume valuable real estate in some storage systems, which may result in increased costs, latency issues, and/or an effective decrease in memory capacity, etc., among other issues.

To reduce some inefficiency, some storage networks and/or systems may use a data deduplication technique in an attempt to reduce the number of redundant copies of data. While some data deduplication techniques do reduce the number of redundant copies of data, these data deduplication techniques may not be able to compensate for some of the inefficiency experienced by some storage networks and/or systems.

For example, some data deduplication techniques used by some storage networks and/or systems may utilize an exact match algorithm to identify data in incoming data streams that match data already stored in the storage network and/or system. Some exact match algorithms may in some cases reduce the number of redundant copies of stored data; however, they often only do so if incoming data and stored data are exactly the same, which may result in unnecessarily storing two pieces of substantially similar data (e.g., a one-off deviation of the data) because the two pieces of data may merely contain slight differences. Accordingly, some storage networks and/or systems can often store what amounts to, in effect, multiple copies of the same data without even recognizing and/or realizing that such unnecessary redundancies exist.

To identify data in a data stream that matches data already stored in the storage network and/or system, some data deduplication techniques utilize one or more reference blocks. A reference block may be a representation of data stored in a storage network and/or system. Incoming data blocks may be compared to the one or more reference blocks to determine if there is a match.

If there is a match, a pointer may be substituted in memory for the actual block of data or data block. A pointer may refer to an instance of the matched data that is already stored in memory. A pointer can be used in place of the matched data block and the data in the matched instance referenced by the pointer can be used in place of the matched data block when access to the data is needed or desired. Since a pointer may include a quantity of data that is less than the quantity of the actual data block itself, less memory space may be consumed by using a pointer as a de facto copy of the data compared to storing the actual data block as another copy of the data.

Inefficiency issues can further occur in some storage networks and/or systems when some reference blocks used to identify some copies of stored data in some incoming data streams may become outdated or may not provide a current representation of data being stored in a storage network and/or system. For instance, when some reference blocks become outdated or do not provide a current representation of some of the data being stored in the storage network and/or system, some redundant copies of the data already stored in the storage network and/or system may be needlessly retained since some reference blocks may not provide an accurate model for comparison purposes from which a match can be properly determined. Improperly determining that some new data does not match some existing data can result in that new data unnecessarily being stored in its entirety in the storage network and/or system. Thus, some prior storage networks and/or systems can experience inefficiency issues because they may not provide a technique for efficiently managing reference blocks.

In addition to updating reference blocks, another part of managing reference blocks that some prior storage networks and/or systems may lack is the ability to properly delete some outdated reference blocks. For instance, some reference blocks for comparison purposes may be stored in an area with limited storage space. At times, some reference blocks may become outdated and yet may remain in the area with limited storage space. As such, these outdated reference block may consume valuable space that could otherwise be used by more relevant or updated reference blocks that match data in an incoming data stream, which can prevent some relevant or updated data blocks from being used as a model for matching purposes because there may not be a sufficient amount of space to store them. Excluding one or more relevant or updated reference blocks for matching purposes can result in multiple copies of the same data being superfluously stored in some storage networks and/or systems.

Another inefficiency experienced by some prior storage networks and/or systems relates to improperly deleting one or more useful reference blocks. For instance, in an effort to maximize the real estate consumed by the reference blocks, some data deduplication techniques delete reference blocks after a determined amount of time and/or if a reference block does not include greater than a predetermined number of hits to free up space for other reference blocks. While this approach can efficiently use the real estate available for storing reference blocks, some useful reference blocks may be deleted too early and/or before their usefulness can be fully attained.

For example, some storage network and/or systems can receive repeating data streams including large amounts of data that are separated by a significant amount of time. For instance, storage networks and/or systems may perform backup operations one a day, week, month, etc., which can be outside of the predetermined amount of time used to evaluate the usefulness of a reference block and can result in reference blocks corresponding to the data being backed up being prematurely deleted. In another example, some storage networks and/or systems can store large data files (e.g., 50-100 GB) in which looking for repetitions in a window of write operations may not occur with much frequency or occur at all, which can also result in reference blocks being prematurely deleted if the predetermined amount of time used to evaluate the usefulness of a reference block is less than the amount of time that it may take to store a large data file. Thus, some prior storage networks and/or systems use inefficient data deduplication techniques to reduce the amount of storage space consumed by data and/or use reference blocks in an inefficient manner, which often results in more data being stored than otherwise should be stored.

SUMMARY

The present disclosure describes various aspects for reliable and efficient data deduplication in various computer systems, such as storage networks and/or storage systems.

In general, one innovative aspect of the subject matter described in this disclosure may be embodied in systems comprising: a non-volatile cache memory device to store a set of chunk reference signatures; and a storage controller coupled to the non-volatile cache memory device. The storage controller includes one or more processors that execute instructions in one or more programs, causing the storage controller to perform operations comprising: receiving a first data chunk including a first set of data blocks; determining a first data chunk signature for the first data chunk; comparing the first data chunk signature and the set of chunk reference signatures to determine a first match between the first data chunk signature and a first chunk reference signature from the set of chunk reference signatures; responsive to determining the first match, identifying a first reference data chunk associated with the first chunk reference signature, the first reference data chunk including a first set of comparison blocks; performing a deduplication technique on the first set of data blocks based on the first set of comparison blocks; and identifying a second reference data chunk based on identifying the first reference data chunk.

These and other implementations may each optionally include one or more of the following features: that the second reference data chunk is a next sequential reference data chunk with respect to the first reference data chunk; that identifying the second reference data chunk is based on the second reference data chunk being the next sequential reference data chunk with respect to the first reference data chunk; that the second reference data chunk includes a second set of comparison blocks; that the operations further comprise receiving a second data chunk including a second set of data blocks, performing the deduplication technique on the second set of data blocks based on the second set of comparison blocks, determining a deduplication ratio for the second set of data blocks, and identifying a third reference data chunk based on the deduplication ratio; that the third reference data chunk is identified responsive to the deduplication ratio being greater than a predetermined ratio; that identifying the third reference data chunk comprises identifying a next sequential reference data chunk with respect to the second reference data chunk as the third reference data chunk; that the operations further comprise, responsive to the deduplication ratio being less than a predetermined ratio, receiving a third data chunk, determining a second data chunk signature for the third data chunk, and comparing the second data chunk signature and the set of chunk reference signatures to determine a second match; that identifying the third reference data chunk comprises associating a second data chunk reference signature that matches the second data chunk signature with the third reference data chunk; a non-volatile storage device coupled to the non-volatile cache memory device and the storage controller; that the non-volatile storage device comprises a primary database storing an active set of comparison blocks; that the operations further comprise loading the active set of comparison blocks to the cache memory device, and performing the deduplication technique on the first set of data blocks utilizing the active set of comparison blocks; that the non-volatile storage device further comprises a first auxiliary database; that the operations further comprise creating first candidate comparison blocks in the first auxiliary database for non-matched data blocks in the first set of data blocks via the deduplication technique; that the non-volatile storage device further comprises a first set of global counters associated with the first candidate comparison blocks; that the operations further comprise, responsive to determining first matched data blocks in the first set of data blocks via the deduplication technique, incrementing first global counters in the first set of global counters for corresponding first candidate comparison blocks, and responsive to a first counter associated with a first particular candidate comparison block exceeding a first predetermined threshold count, promoting the first particular candidate comparison block in the first auxiliary database to a comparison block in a buffer memory; that the first candidate comparison blocks comprise respective second data signatures; that the second data signatures are based on first fingerprints of the first candidate comparison blocks; that the second data signatures are further based on second fingerprints of the first fingerprints; that the non-volatile storage device further comprises a second auxiliary database storing a set of second candidate comparison blocks and a second set of global counters associated with second candidate comparison block signatures; that the operations further comprise, responsive to determining second matched data blocks in the first set of data blocks via the deduplication technique, incrementing second global counters in the second set of global counters for corresponding second candidate comparison blocks, and responsive to a second counter associated with a second particular candidate comparison block exceeding a second predetermined threshold count, promoting the second particular candidate comparison block in the second auxiliary database to a first candidate comparison block in the first auxiliary database; that the operations further comprise performing a first garbage collection technique on the buffer memory to delete a first predetermined quantity of candidate comparison blocks from the buffer memory to create space for promoted first candidate comparison blocks, performing a second garbage collection technique on the first auxiliary database to delete a second predetermined quantity of first candidate comparison blocks to create space in the first auxiliary database for promoted second candidate comparison blocks; and that the first garbage collection technique and the second garbage collection technique create a multi-layer mechanism that provides an exponential increase in matching opportunity for the deduplication technique.

In general, one innovative aspect of the subject matter described in this disclosure may be embodied in methods comprising: storing, in a non-volatile cache memory device, a set of chunk reference signatures; receiving a first data chunk including a first set of data blocks; determining a first data chunk signature for the first data chunk; comparing the first data chunk signature and the set of chunk reference signatures to determine a first match between the first data chunk signature and a first chunk reference signature; responsive to determining the first match, selecting a first reference data chunk associated with the first chunk reference signature; performing a first instance of a deduplication technique on the first set of data blocks based on the first reference data chunk; anticipating a receipt of a first anticipated next sequential data chunk with respect to the first data chunk; and selecting a first anticipated reference data chunk that is associated with the first anticipated next sequential data chunk.

These and other implementations may each optionally include one or more of the following features including: receiving the first anticipated next sequential data chunk; performing a second instance of the deduplication technique on the first anticipated next sequential data chunk utilizing the first anticipated reference data chunk; determining a deduplication ratio for the second instance of the deduplication technique, the deduplication ratio being greater than a predetermined ratio; selecting a second anticipated reference data chunk that is associated with a second anticipated next sequential data chunk; performing a third instance of the deduplication technique on the second anticipated next sequential data chunk utilizing the second estimated reference data chunk; determining a deduplication ratio for the second instance of the deduplication technique, the deduplication ratio being less than a predetermined ratio; receiving a second data chunk; determining a second data chunk signature for the second data chunk; comparing the second data chunk signature and the set of chunk reference signatures to determine a second match; and responsive to the second match, selecting a second reference data chunk for use in a third instance of the deduplication technique.

In general, one innovative aspect of the subject matter described in this disclosure may be embodied in methods comprising: storing a plurality of comparison blocks in a memory of a non-volatile storage device in association with a first plurality of reference blocks; storing a plurality of first candidate comparison blocks in a first auxiliary database of the non-volatile storage device in association with a second plurality of reference blocks; storing a plurality of second candidate comparison blocks in a second auxiliary database of the non-volatile storage device in association with a third plurality of reference blocks; ordering the memory, the first auxiliary database, and the second auxiliary database hierarchically; receiving a set of data blocks; identifying an active set of comparison blocks in the plurality of comparison blocks; comparing first data signatures of the data blocks and second data signatures of the comparison blocks to determine matched data signatures and unmatched data signatures; creating first reference blocks for first data blocks pointing to first stored data blocks corresponding to the matched data signatures; incrementing counters associated with comparison blocks in the active set of comparison blocks having the matched data signatures; storing second data blocks corresponding to the unmatched data signatures; creating a set of second candidate comparison blocks in the second auxiliary database corresponding to the stored second data blocks; responsive to a counter associated with a second candidate comparison block in the set of second candidate comparison blocks exceeding a predetermined quantity, promoting the second candidate comparison block to a set of first candidate comparison blocks in the first auxiliary database; and that creating the set of second candidate comparison blocks comprises generating first fingerprints for the second candidate comparison blocks of the set, and generating second fingerprints for the first fingerprints as fingerprints of fingerprints (FOFs), the second data signatures including the FOFs, and the FOFs being utilized for comparing the second data signatures and the first data signatures to determine the matched data signatures and unmatched data signatures.

Other implementations of one or more of these aspects include corresponding systems, apparatus, and computer programs, configured to perform the actions of the methods, encoded on computer storage devices.

The technology disclosed herein provides a number of advantages and benefits over prior solutions, including, but not limited to, being more reliable and/or more efficient than other storage networks and/or systems, such as those described in the Background, providing hardware and/or software with functionality to reduce or eliminate needless redundant copies of data stored in storage networks and/or storage systems. It should be understood that the foregoing advantages and benefits are provided by way of example and that the technology may have numerous further advantages and benefits. Further, it should be understood that the Summary describes various example aspects of the subject matter of this disclosure and is not intended to encompass every inventive aspect.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The innovative technology disclosed herein includes various aspects, such as systems, methods, apparatuses, computer-readable media, computer program products, etc., for data deduplication in a storage system. By overcoming many of the inefficiencies experienced by previous systems, the systems, methods, apparatuses, computer-readable media, computer program products, etc. disclosed herein provide a variety of improvements over previous storage systems. The various embodiments disclosed herein can more efficiently and/or more effectively utilize storage resources in a storage network and/or system than other techniques. For instance, the various aspects disclosed below include hardware and/or software to advantageously utilize less storage space when storing data than other technologies.

Figure 1:
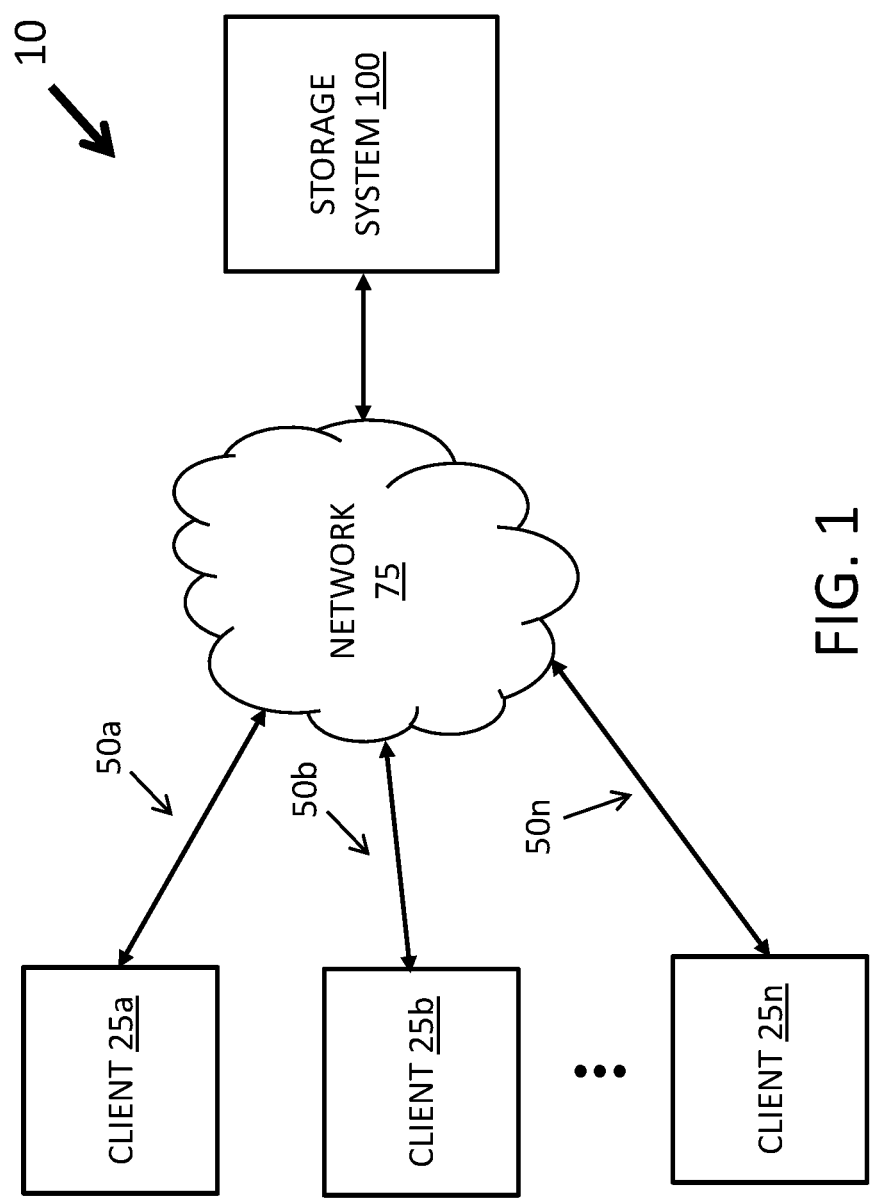
FIG. 1 is a block diagram of an example computing network for storing data.

With reference to the drawings, FIG. 1 is a block diagram of an example storage network 10. As shown, the storage network 10 can include, among other components, client devices 25a, 25b, ... 25n (also simply referred to individually, in various groups, or collectively, as client device(s) 25) capable of being coupled or coupleable to and in communication with a storage system 100 via a wired and/or wireless network 75 (e.g., public and/or private computer networks in any number and/or configuration (e.g., the Internet, an intranet, a cloud network, etc.)). Other examples may include one client device 25 or two or more client devices 25 such that the various embodiments are not limited to three (3) client devices 25.

A client device 25 can include any computing hardware and/or software (e.g., a thick client, a thin client, or hybrid thereof) that is known or developed in the future that is capable of accessing storage system 100 via network 75. Client devices 25a, 25b, . . . 25n, as part of their respective operation, may transmit respective data streams 50a, 50b, . . . 50n (also simply referred to individually, in various groups, or collectively, as data stream(s) 50) to the storage system 100. A data stream 50 can include input/output (I/O) requests to the storage system 100 to write data, read data, and/or modify data, etc. For instance, a client device 25 can transmit data streams 50 that can include I/O requests to write, read, store, communicate, propagate, and/or transport instructions, data (e.g., data chunks, data blocks, etc.), computer programs, software, code, routines, etc., to the storage system 100.

A data stream 50 may include a sequence of related I/O requests generated by an application/application component in the client devices 25. Further, a data stream 50 may include a predetermined sequence/order of data chunks, data blocks, and/or data blocks in a data chunk. Moreover, the client device(s) 25 can transmit two or more data streams 50 including a set of data chunks and/or data blocks arranged in one or more repeating patterns or sequences. For instance, two or more data streams 50 may include a set of data chunks [A, B, C, D] transmitted/arranged in same order such as, for example, C, A, D, B, among other quantities and/or sequences that are possible and contemplated herein.

Storage system 100 can be accessed by the client device(s) 25 and/or communication with storage system 100 can be initiated by the client device(s) 25 through a network socket (not shown) utilizing one or more inter-process networking techniques. In various embodiments, the client device(s) 25 and storage system 100 may comprise at least a portion of a client-server model.

Figure 2:
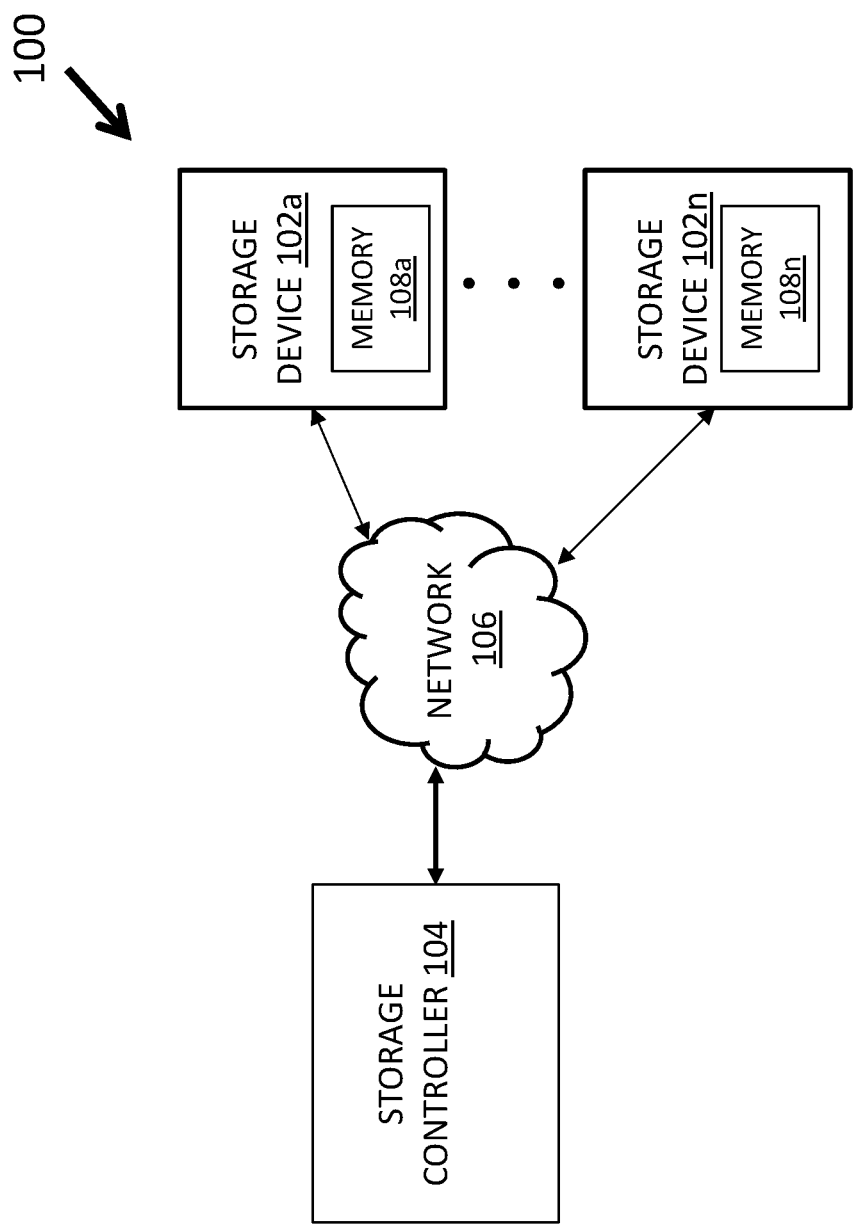
FIG. 2 is a block diagram of an example storage system included in the example computing network of FIG. 1.

With reference to FIG. 2, a block diagram of an example storage system 100 is illustrated. As shown, the storage system 100 may comprise, among other components, multiple storage devices 102a . . . 102n and a storage controller 104 coupled to and in communication with storage devices 102a . . . 102n via a wired and/or wireless network 106.

In various embodiments, storage devices 102a . . . 102n (also simply referred to individually, in various groups, or collectively, as storage device(s) 102) may be any type of storage device that is known or developed in the future that is capable of storing data. In various embodiments, a storage device 102 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

Storage devices 102a through 102n can be implemented as flash memory (e.g., a solid-state device (SSD) or other non-volatile storage devices that store persistent data). Further, a storage device 102, in some embodiments, may include non-transitory memory such as, for example, a dynamic random access memory (DRAM) device, a static random access memory (SRAM) device, a hard disk drive (HDD), storage tape (e.g., magnetic and/or virtual), and/or other types (e.g., non-volatile and/or persistent) of memory devices, etc.

A storage device 102, in various embodiments, may include non-volatile/persistent hardware and/or software configured to perform long-term data storage operations, including, but not limited to, data archiving, data backup, data mirroring, replicating data, etc. For instance, a storage device 102 may include non-volatile and/or persistent hardware and/or software configured for performing long-term data storage operations, which may include write operations, read operations, read-write operations, etc., among other operations.

In various embodiments, a storage device 102 can store data in data blocks and/or as reference blocks. A data block can refer to a block of data received from a client device 25 for storage in one or more of storage devices 102. A data block may comprise any type of computer-readable data that is known or developed in the future. The data in a data block can be original data, compressed data, encrypted data, encoded data, and/or re-written data, etc., among other types of data that are possible and contemplated.

Further, a data block can include any suitable size that is known or developed in the future that enable data to be stored in storage device(s) 102. In various embodiments, a data block includes a size of about four kilobytes (4 KB), although other sizes are possible and contemplated herein.

A reference block may be a block of data that includes a value (e.g., a pointer, an address, etc.) that refers to a data block in a storage device 102 and/or in an incoming data stream 50 including the same or substantially similar data. In addition, a reference block may be a synthesized data block that is not created directly from a data block. For instance, a data block with all zeroes can be a synthesized data block even if a data stream 50 does not include a data block with all zeroes.

A reference block can reduce the amount of memory space needed in a storage device 102 to store copies or substantially similar (e.g., within a standard deviation) copies of the same data. For example, when it may be desirable to access a copy of some data (e.g., a read request or operation), instead of accessing an actual copy of the data, a pointer in a reference block can be used in place of or as a substitution for the actual data block by directing the read operation to a data block including the same or substantially similar data as the copy.

A reference block may include a smaller quantity of data than an actual data block. Accordingly, because a reference block can serve as a de facto copy of a data block, a reference block can allow memory space in a storage device 102 to be used more efficiently compared to storing an actual copy of the data block. As a non-limiting example, a reference block set may utilize 0.05% of available memory space.

In various embodiments, a reference block can be removed/deleted from a storage device 102. Further, a reference block, in some embodiments, may be relocated/moved from one location within a storage device 102 to another location within the same storage device 102 or to a different storage device 102.

In various embodiments, when a data block is deleted or over written, a reference block that refers to the data block may be deleted. Further, when a data block is relocated, a reference block that refers to the data block may be modified to include a new value (e.g., pointer, address, etc.) that corresponds to the new location of the data block to which it points or refers.

In some embodiments, associated data blocks and reference blocks may be stored in the same storage device 102. Further, associated data blocks and reference blocks initially stored in the same storage device 102 may be moved together to new respective locations within the same storage device 102 or to new respective locations within the same new storage device 102.

Figure 3:
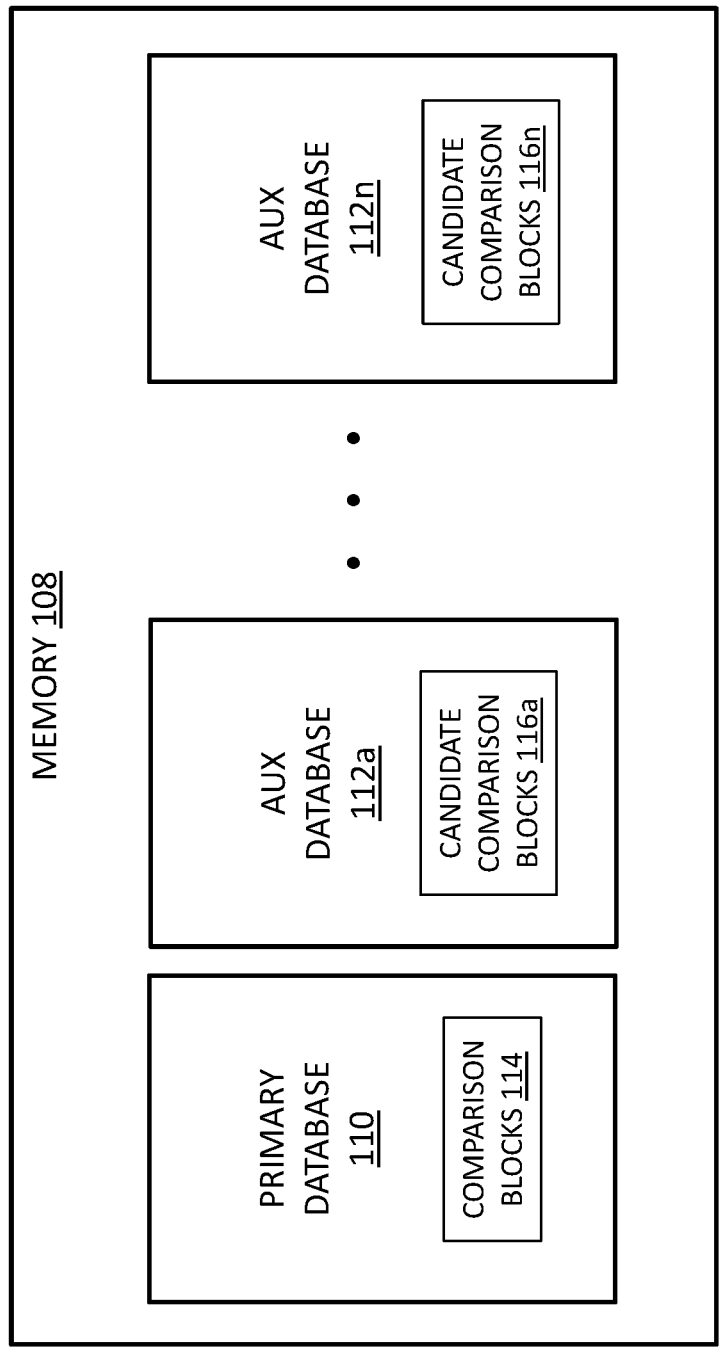
FIG. 3 is a block diagram of an example memory included in the example storage system of FIG. 2.

In various embodiments, storage devices 102 may include hardware and/or software to divide and/or partition their physical storage space into smaller memory units that can be referred to herein as memory 108a . . . 108n (also simply referred to individually, in various groups, or collectively, as memory 108). Referring now to FIG. 3, a memory 108 may store a primary database 110 and one or more auxiliary databases 112a . . . 112n (also simply referred to individually, in various groups, or collectively, as auxiliary databases(s) 112). Other examples may include one auxiliary database 112 or two or more auxiliary databases 112 such that the various embodiments are not limited to two (2) auxiliary databases 112.

A primary database 110 can include any hardware or combination of hardware/software that is capable of storing/buffering computer-readable data. As illustrated, a primary database can store a plurality of comparison blocks 114 associated with data blocks stored in storage devices 102. A comparison block 114 can provide a representation (e.g., a hash value) of a data block stored in storage device(s) 102 and/or in various incoming data streams 50 and can be used as a model in determining a match. In various embodiments, a set of comparison blocks 114 may be selected to create one or more active sets of comparison blocks 114 that can be utilized to determine if/when a data block in one or more incoming data streams 50 match a data block currently being stored in storage device(s) 102.

In various embodiments, the primary database 110 uses one active set of comparison blocks 114 at a time. In some embodiments, an active set can be selectively retired and replaced by a new active set upon the occurrence of a predetermined retirement event. Non-limiting examples of a predetermined retirement event may include, but are not limited to, less than a threshold quantity or relative quantity of data blocks in one or more incoming data streams 50 matching comparison blocks in an active set, expiration of a predetermined amount of time, less than a threshold quantity or relative quantity of matches within a predetermined amount of time, etc., although other predetermined retirement events are possible and contemplated herein. Upon retirement, a retired active set and/or one or more comparison blocks 114 in a retired active set can be at least temporarily retained in the primary database 110, which can be referred to herein as a passive set.

In various embodiments, the primary database 110 may store one or more passive sets at any given time. In some embodiments, the passive set(s) may be comprised of about twenty percent (20%) of the total number of comparison blocks 114 in the primary database 110, although other percentages and/or quantities are possible and contemplated herein.

A passive set can be deleted/removed from the primary database 110 and/or one or more of the comparison blocks 114 in a passive set can be selectively deleted and/or demoted from the primary database 110 to free memory space for a new or promoted comparison block 114. In some embodiments, a deleted passive set and/or deleted comparison block 114 may be deleted from the memory 108. In further embodiments, a comparison block 114 in a passive set may be demoted to a candidate comparison block 116 in the auxiliary databases 112. For instance, a comparison block 114 may be demoted to the next lower location/status (e.g., the auxiliary database 112a), an intermediate lower location/status (e.g., an auxiliary database 112 between auxiliary databases 112a and 112n), a lowest location/status (e.g., the auxiliary database 112n), a predetermined or default status/location, etc., among other possibilities that are contemplated herein.

In various embodiments, one or more new comparison blocks 114 can be added and/or promoted to the primary database 110. For example, a new comparison block 114 may include a candidate comparison block 116a that is being promoted to the primary database 110 from an auxiliary database 112a, as discussed elsewhere herein.

An auxiliary database 112 can include any hardware or combination of hardware/software that is capable of storing/buffering computer-readable data. In various embodiments, the auxiliary databases 112 may be arranged to include a hierarchical order. For instance, the auxiliary database 112a may define a higher location and/or status than the auxiliary database 112n in the hierarchical order. The hierarchical order, in some embodiments, may further include the primary database 110. For instance, the primary database 110 may define the highest position that may be followed by the auxiliary database 112a, which can be followed by the auxiliary database 112n, among other possibilities that are contemplated herein.

The auxiliary databases 112a . . . 112n may include space to store a corresponding plurality of candidate comparison blocks 116a . . . 116n (also simply referred to individually, in various groups, or collectively, as candidate comparison block(s) 116). Other examples may include one plurality of candidate comparison blocks 116 or two or more pluralities of comparison blocks 116 such that the various embodiments are not limited to two (2) pluralities of comparison blocks 116.

An auxiliary database 112 can include two or more partitions to store different types of candidate comparison blocks 116. In some embodiments, candidate comparison blocks 116 can be differentiated based on the manner in which an associated counter is incremented. For instance, a first partition may store candidate comparison blocks 116 that include counters incremented relatively rapidly in the short-term and a second partition may store candidate comparison blocks 116 that include counters incremented relatively slowly in the long-term, as discussed elsewhere herein.

A candidate comparison block 116 can provide a representation (e.g., a hash value) of a data block stored in storage device(s) 102 and/or in various incoming data streams 50 and can be used as a model in determining a match. A candidate comparison block 116 can include the potential to be promoted to one or more higher locations and/or statuses in a hierarchical order. For instance, a candidate comparison block 116a in the auxiliary database 112a can be promoted to a comparison block 114 in the primary database 110 and/or a candidate comparison block 116n in the auxiliary database 112n can be promoted to a candidate comparison block 116a in the auxiliary database 112a and/or to a comparison block 114 in the primary database 110, as discussed elsewhere herein.

In one example, a candidate comparison block 116n in the auxiliary database 112n can first be promoted to a candidate comparison block 116 in one or more intermediate auxiliary databases 112 and eventually be promoted to a candidate comparison block 116a in the auxiliary database 112a, and then ultimately be promoted to a comparison block 114 in the primary database 110. In another example, a candidate comparison block 116*n* in the auxiliary database 112*n* can be promoted to a candidate comparison block 116*a* in the auxiliary database 112*a*, and then ultimately be promoted to a comparison block 114 in the primary database 110. In a further example, a candidate comparison block 116*n* in the auxiliary database 112*n* can skip being promoted to one or more intermediate auxiliary databases 112 and be directly promoted to a candidate comparison block 116*a* in the auxiliary database 112*a*, and then ultimately be promoted to a comparison block 114 in the primary database 110. In yet another example, a candidate comparison block 116*n* in the auxiliary database 112*n* can skip being promoted to one or more higher auxiliary databases 112 and be directly promoted to a comparison block 114 in the primary database 110.

In various embodiments, a candidate comparison block 112 may be promoted to a higher location and/or status in response to detection of a predetermined event. Non-limiting examples of a predetermined event may include, but are not limited to, a threshold quantity of data blocks in one or more incoming data streams 50 matching a candidate comparison block 116 or a threshold quantity of matches within a predetermined amount of time, etc., although other predetermined events are possible and contemplated herein.

A candidate comparison block 116 in an auxiliary database 112 can be removed from the memory 108 or demoted to a lower auxiliary database 112. For instance, a comparison block 114 may be demoted to the next lower auxiliary database 112, an intermediate lower location/status (e.g., an auxiliary database 112 between the next lower auxiliary database 112 and auxiliary database 112*n*), a lowest location/status (e.g., the auxiliary database 112*n*), a predetermined or default status/location, etc., among other possibilities that are contemplated herein.

In various embodiments, a set of candidate comparison blocks 116 may be deleted/demoted from an auxiliary database 112. In some embodiments, two or more candidate comparison blocks 116 can be grouped together to create a set of candidate comparison blocks 116, a representative candidate comparison block 116 may then be selected for demotion, and the non-selected candidate comparison block(s) may then be deleted from the memory 108.

A representative candidate comparison block 116 may be a comparison block that includes one or more predetermined qualities. Non-limiting example qualities may include, but are not limited to, the highest relative quantity of matched data blocks in one or more incoming data streams 50, the highest relative quantity of matched data blocks within a predetermined amount of time, the relatively shortest time duration in the auxiliary database 112 or memory 108, the relatively longest time duration in the auxiliary database 112 or memory 108, etc., although other predetermined qualities are possible and contemplated herein.

Candidate comparison blocks 116 may be identified for removal/demotion from an auxiliary database 112 in response to detecting a predetermined event. Non-limiting examples of a predetermined event may include, but are not limited to, less than a threshold quantity or relative quantity of data blocks in one or more incoming data streams 50 matching a candidate comparison block, expiration of a predetermined amount of time, or less than a threshold quantity or relative quantity of matches within a predetermined amount of time, etc., although other alternative predetermined events are possible and contemplated herein.

A new candidate comparison block 116 may be created in and/or added to an auxiliary database 112 in response to a data block in an incoming stream 50 not matching any comparison block 114 in the primary database 110 and any candidate comparison block 116 in the auxiliary database(s) 112. In various embodiments, a new candidate comparison block may be added to the auxiliary database 112 with the highest location/status (e.g., the auxiliary database 112*a*), an auxiliary database 112 with an intermediate location/status (e.g., an auxiliary database 112 between auxiliary databases 112*a* and 112*n*), an auxiliary database 112 with the lowest location/status (e.g., the auxiliary database 112*n*), a predetermined or default auxiliary database 112, etc., among other possibilities that are contemplated herein.

In various embodiments, a candidate comparison block 116 includes a block reference signature that can remain with the candidate comparison block 116 while it is promoted. For instance, each candidate comparison block 116 and comparison block 114 may include the same reference signature that it included when it was created and/or added to the memory 108, although other variations are also possible and contemplated.

In various embodiments, the block signatures may include one or more fingerprints. A block signature may include any quantity of fingerprints. In some embodiments, a block reference signature can include eight (8) fingerprints, although other quantities are possible and contemplated herein.

A fingerprint may further include any size that is known or developed in the future capable of representing the data in a candidate comparison block 114 and/or comparison block 116. In some embodiments, a fingerprint includes a size of about two (2) bytes.

A fingerprint can be generated using any suitable algorithm and/or technique that is known or developed in the future capable of generating a representation of the data in a candidate comparison block 116 and/or comparison block 114. In various embodiments, a fingerprint may be generated based on a Rabin Fingerprinting algorithm.

In some embodiments, an algorithm/technique for creating a fingerprint can break a data block corresponding to the candidate comparison block 116 being created into one or more 8-byte overlapping shingles and may then compute a hash value for each shingle, which can be referred to as a fingerprint. Subsequent to computing the fingerprints for the data block, the algorithm/technique can then assign the one or more fingerprints to the candidate comparison block 116. For instance, eight (8) two-byte fingerprints can be combined to create a 16-byte signature of a data block for inclusion in a candidate comparison block 116 or comparison block 114.

In various embodiments, a block signature may include a reference meta-signature. A reference meta-signature may be created using any suitable algorithm and/or technique that is known or developed in the future capable of generating a representation of the data in a candidate comparison block 116 and/or comparison block 114 based on one or more reference signatures. In some embodiments, the algorithm/technique for creating a reference meta-signature may be based on a Broder's document matching technique and/or MinHash schemes.

Some algorithms/techniques for creating a reference meta-signature may include performing a subsequent Rabin Fingerprinting algorithm on a previously generated block reference signature to create a smaller signature, which can also be referred to herein as a fingerprint-of-fingerprint (FOF). In some embodiments, performing a subsequent Rabin Fingerprinting algorithm on a 16-byte reference signature can create a 3-byte block reference meta-signature or FOF, although other sizes are possible and contemplated herein (e.g., 2-byte, 4-byte, 5-byte, . . . etc.).

The following example may be helpful in understanding various operations to create a FOF that can form the basis of a block reference signature. While the example is described as using specific techniques and/or values, the specific techniques and/or values were selected primarily for instructional purposes and ease in understanding, and not to limit the scope of the technology in any manner.

In this example, a 16-byte block reference signature including eight (8) two-byte fingerprints is created using a Rabin Fingerprinting algorithm. The eight fingerprints are sorted and shingling two consecutive fingerprints may create seven (7) hash values (e.g., 8-bit hash values, etc.). If f( ) can represent the shingling function, a shingling operation can be represented as following:

H(0)=f(sig(0), sig(1));
H(1)=f(sig(1), sig(2));
H(2)=f(sig(2), sig(3));
H(3)=f(sig(3), sig(4));
H(4)=f(sig(4), sig(5));
H(2)=f(sig(5), sig(6)); and
H(6)=f(sig(6), sig(7)).

A quantity of hash values can be selected and utilized as the FOF. For instance, selecting the two largest hash values can create a 2-byte (16 bit) FOF signature, selecting the three largest hash values can create a 3-byte (24 bit) FOF signature, . . . selecting all of the hash values can create a 7-byte (56 bit) FOF signature. For a 3-byte FOF signature, supposing that each 2-byte fingerprint of a data block can be represented using English alphabets (A-Z) by an alphabet string with eight (8) letters in sorted order as F0=[BEGJM-PRV], a set of fingerprint shingles for F0 can be written as: SF0=[(BE), (EG), (GJ), (JM), (MP), (PR), (RV)]. If another block signature that has, for example, seven (7) fingerprints common with F0, then at least 4 out of 7 shingles in SF0 will appear in the shingle set of the other block signature.

To illustrate a non-limiting example, another block signature may be: F1=[BEJKMPRV], such that a difference between the block signatures is fingerprint G in F0 is replaced by fingerprint K in F1. The shingle set for F1 may be represented as: SF1=[(BE), (EJ), (JK), (KM), (MP), (PR), (RV)]. Here, block signatures F0 and F1 have four (4) shingles in common: [(BE), (MP), (PR), (RV)]. In another non-limiting example, if two block signatures have six (6) fingerprints in common, at least three (3) fingerprint shingles will be common between the sets of fingerprint shingles.

In various embodiments, a new candidate comparison block 116 may further include an associated counter, which can be maintained throughout its lifecycle (e.g., can be maintained as the candidate comparison block 116 is promoted/demoted). A counter may be incremented and/or decremented based on various events. For instance, a counter may be incremented responsive to a data block in an incoming data stream 50 matching (e.g., via block signatures/fingerprints) an associated comparison block 114 or candidate comparison block 116. In some embodiments, one or more counters may be initially set to a predetermined quantity that is greater than zero, which can include any suitable quantity.

A counter may be decremented upon the occurrence of a predetermined event. For instance, a counter may be decremented responsive to a reference block pointing to a data block represented by a comparison block 114 or candidate comparison block 116 being deleted from storage devices 102, is written over by new data (e.g., a new data block), no longer represents the associated data block etc., although other events are possible and contemplated herein.

In various embodiments, the counters may include any suitable size and can be maintained as one or more arrays of counters, which can include any suitable size and/or quantity of counters. In some embodiments, an array of counters may include about sixteen million ($\approx$16M or $2^{24}$) 8-byte counters. For instance, an array including about 16 million counters associated with the FOF signatures in the example discussed above may include a size of about one hundred twenty-eight megabytes (128 MB).

A comparison block 114 and/or candidate comparison block 116 can include two or more counters that can be included in two or more arrays of counters. In various embodiments, a first counter may track short-term hits and a second counter may track long-term hits for a comparison block 114 and/or candidate comparison block 116. For instance, a short-term counter may track the quantity of hits for a comparison block 114 in an active set and/or candidate comparison block 116 while in an auxiliary database 112. Further, a long-term counter may track the cumulative quantity of hits for a comparison block 114 and/or candidate comparison block 116 during its lifecycle.

Figure 4:
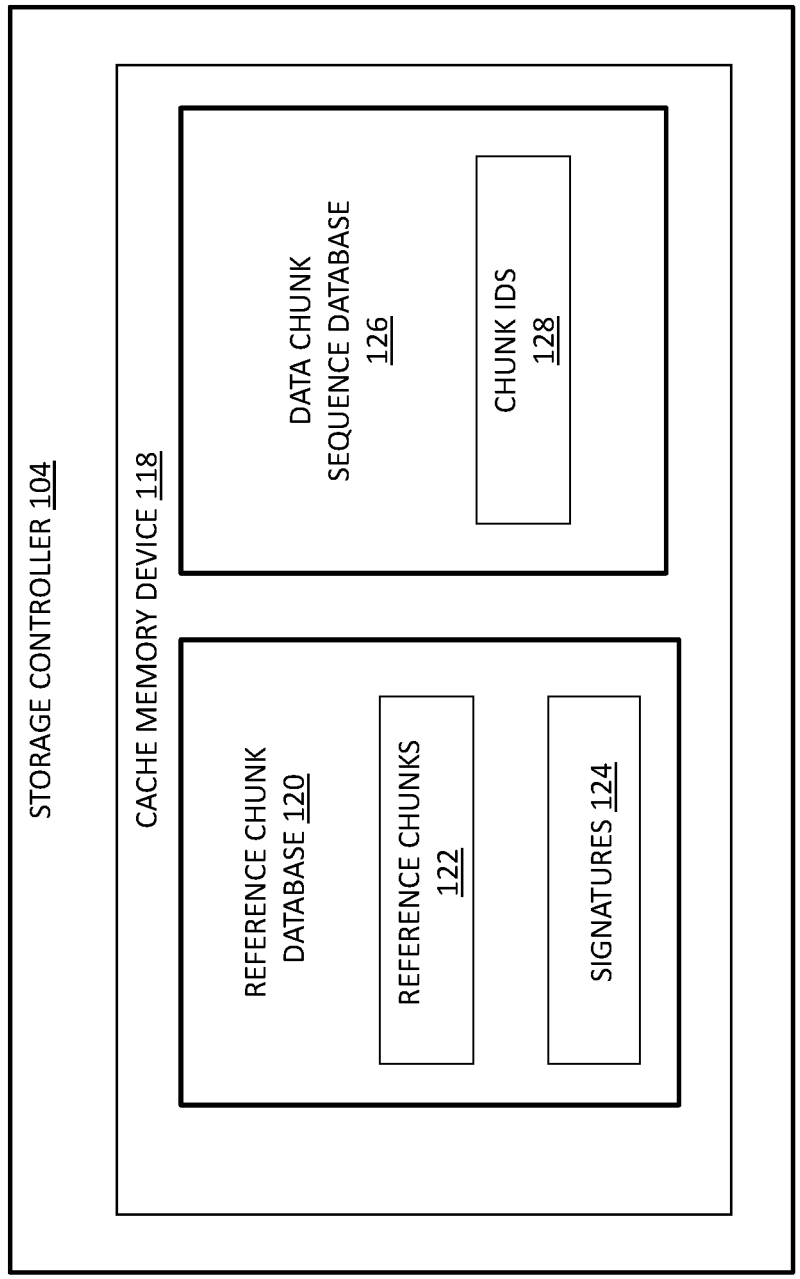
FIG. 4 is a block diagram of an example storage controller included in the example storage system of FIG. 2.

With reference to FIG. 4, storage controller 104 may include, among other components, a cache memory device 118 comprising a reference chunk database 120 and a data chunk sequence database 122, among other components. The cache memory device 118 may be any type of memory device (e.g., hardware and/or software) that is known or developed in the future that is capable of storing/buffering data for retrieval when an I/O request (e.g., write request, read request, and/or read-write request, etc.) is received at the storage system 100.

A reference chunk database 120 can include one or more reference chunks 122 and/or one or more chunk reference signatures. A reference chunk 122 can provide a representation (e.g., a hash value) of a data chunk stored in storage device(s) 102 and/or in various incoming data streams 50 and can be used as a model in determining a match.

In various embodiments, a reference chunk 122 may include an associated chunk reference signature 124. A chunk reference signature 124 may be a representation of the signatures of one or more comparison blocks 114 and/or candidate comparison blocks 116 included in an associated data chunk stored in the storage devices 102. A chunk reference signature 124 can be used to determine if data chunks in one or more incoming data streams 50 match the data chunk and/or data blocks associated with the comparison blocks 114 and/or candidate comparison blocks 116 in the data chunk.

In some embodiments, a chunk reference signature 124 can represent an alignment data chunk. An alignment data chunk can be a data chunk that may be used as a reference to indicate the beginning a repeating pattern of data chunks and/or data blocks in an incoming data stream 50. For instance, identifying an alignment data chunk can be used to determine and/or estimate the receipt of one or more subsequent data chunks of an incoming data stream 50 in a particular sequence or order.

A chunk reference signature 124, in various embodiments, may be based on one or more fingerprints included in one or more comparison blocks 114 and/or candidate comparison block(s) 116 of a data chunk, as discussed elsewhere herein. A chunk reference signature 124 may be created by selecting a predetermined number of hash values or fingerprints, which can include any suitable quantity, over the shingles of the comparison block(s) 114 and/or candidate comparison block(s) 116 of a reference data chunk 122. In some embodiments, the top N number of fingerprints based on the overlapping quantity in a reference data chunk 122 may be selected for inclusion in a chunk reference signature 124. In additional or alternative embodiments, the number of fingerprints included in a chunk reference signature 124 can be in the range of about sixty-four (64) to about one hundred twenty-eight (128) fingerprints, although other ranges and/or quantities are possible and contemplated herein.

A data chunk sequence database 126 can include any hardware or combination of hardware/software that is capable of storing/buffering computer-readable data. In some embodiments, a data chunk sequence database 126 may store a set of chunk IDs 128 that can be utilized to identify data chunks and/or differentiate two or more data chunks in incoming data streams 50.

Further, the chunk IDs 128 can include information and/or be arranged in a manner that allows identification of one or more sequences/orders that data chunks can be received in one or more data streams 50 from the client device(s) 25. In various embodiments, the data chunk sequence database 126 may provide and/or include a sequence number associated with each chunk ID 128 to identify a respective position within one or more sequences for each of a plurality of data chunks. For instance, a data chunk can be included in two or more different sequences of data chunks and may include a sequence number corresponding to each different sequence.

In various embodiments, a chunk ID and/or sequence number(s) may be utilized to identify an alignment data chunk in a data stream 50. An alignment data chunk can be used to identify the beginning of a predetermined and/or known sequence of data chunks in a data stream 50. For instance, upon detection of an alignment data chunk, a quantity of subsequent data chunks and the order in which the subsequent data chunk(s) will be received can be anticipated/estimated. In some embodiments, an alignment data chunk may be associated with a unique type of chunk ID and/or one or more unique sequence numbers. Examples of a unique sequence number may include, but are not limited to, a global sequence number across every data stream 50, a sequence number that can identify a previous alignment data chunk for use in constructing a linked list of successive alignment chunks in a data stream 50, a reference alignment data chunk sequence number that can be used as a sequence number for an alignment data chunk that is used as a reference in a data deduplication technique, the data block signatures of each data block in an alignment chunk, etc., among other possibilities that are contemplated herein.

Returning to FIG. 2, a storage controller 104 may include, among other components, hardware and/or software to manage storage operations in the storage system 100. In various embodiments, a storage controller 104 may at least partially manage data storage in storage system 100 utilizing one or more data deduplication techniques.

In various embodiments, a storage controller 104 can receive data streams 50 from the client devices 25 and determine the source client device 25 for each data stream 50. In some embodiments, a storage controller 104 can indirectly identify a source client device 25 using a process ID, a file handle ID, etc. for the data streams 50. In further embodiments, the source client device 25 may be specified in a data stream ID that identifies the transmitting application, which can be generated by a controller (not shown) in the source client device 25.

Further, a storage controller 104 can identify a source client device 25 for each received data stream 50 when multiple data streams 50 are simultaneously or nearly simultaneously writing to the storage device(s) 102. For instance, a storage controller 104 may arbitrarily or otherwise interleave the various I/O requests in the data streams 50 to the storage device(s) 102.

In various embodiments, a storage controller 104, upon receipt, may identify the data chunks in a data stream 50 and determine a chunk signature for the data chunks based on the data blocks in each data chunk. In some embodiments, an incoming data stream 50 may be broken down into data chunks using content-defined boundaries based on one or more content-based data chunking techniques that use a Rabin Fingerprinting algorithm, as discussed elsewhere herein. Further, a storage controller 104 may create a chunk signature with one or more characteristics or properties that correspond to the chunk reference signatures 124. For instance, if the chunk reference signatures 124 in the cache memory device 118 are based on the top 64 or 128 fingerprints of corresponding reference chunks 122, a storage controller 104 can create a chunk signature including the top 64 or 128 fingerprints for the data blocks in the data chunk.

A storage controller 104 can compare a chunk signature to the set of reference chunk signatures 124 in the reference chunk database 120 to determine if there is a match. In some embodiments, a match may be determined if a chunk signature matches a reference chunk signature 124 that corresponds to an alignment data chunk. In various embodiments, a match may be determined if a chunk signature matches any reference chunk signature 124.

A match may be determined when a data chunk and a reference chunk 122 match one another by greater than or equal to a threshold or relative amount. A threshold amount, in various embodiments, may be in the range of about 30% to about 100%, although other ranges, percentages, and/or quantities are possible and contemplated herein. In some embodiments, a threshold amount may be less than 100% or that a non-exact match can still be considered a match. For instance, a data chunk with a signature including sixty-four (64) fingerprints may match a reference chunk 122 when at least nineteen (19) fingerprints in the data chunk and reference chunk 122 match, among other quantities of matching fingerprints that are possible and contemplated herein such that greater than or less than nineteen matching fingerprints may define a match. In another instance, a data chunk with a signature including one hundred twenty-eight (128) fingerprints may match a reference chunk 122 when at least thirty-eight (38) fingerprints in the data chunk and reference chunk 122 match, among other quantities of matching fingerprints that are possible and contemplated herein such that greater than or less than thirty-eight matching fingerprints may define a match.

Responsive to matching chunk signatures, a storage controller 104 may perform a data deduplication technique on the data chunk utilizing a reference chunk 122 associated with the matched chunk reference signature 124. Some data deduplication techniques may compare the data blocks in a data chunk to the comparison blocks 114 in a reference chunk 122 to determine a match. A match may be determined when a data block and a comparison block 114 match one another by greater than or equal to a threshold or relative amount. A threshold amount, in various embodiments, may be in the range of about 30% to about 100%, although other ranges, percentages, and/or quantities are possible and contemplated herein. In some embodiments, a threshold amount may be less than 100% or that a non-exact match can still be considered a match. For instance, a data block with a signature including eight (8) fingerprints may match a comparison block 114 when at least three (3) fingerprints in the data block and comparison block match, among other quantities of matching fingerprints that are possible and contemplated herein such that greater than or less than three matching fingerprints may define a match.

Responsive to matching data blocks, some data deduplication techniques may store a respective reference block in a storage device 102 in place of one or more matched data blocks. A reference block may include a pointer that points to a data block already stored in storage devices 102 represented by a matched comparison block 114 or candidate comparison block 116, as discussed elsewhere herein. In this manner, storage controller 104 may create one or more reference blocks in one or more of storage devices 102.

Responsive to non-matching data blocks, storage controller 104 may store a data block, in its entirety, in the storage device(s) 102. In this manner, storage controller 104 may store one or more data blocks in the storage device(s) 102. One or more data blocks in the storage devices 102 may have the potential to serve as a stored instance of data that can be pointed to by one or more reference blocks of one or more data blocks that may be matched in the future.

Responsive to non-matching chunk signatures, a storage controller 104 may perform a data deduplication technique on the data blocks of a data chunk utilizing an active set of comparison blocks 114. In some embodiments, the active set of comparison blocks 114 may be loaded from the primary database 110 in memory 108 to the cache memory 118 prior to performing a data deduplication technique.

Some data deduplication techniques may compare the data blocks in a non-matched data chunk to the comparison blocks 114 in an active set to determine a match. A match may be determined when a data block and a comparison block 114 match one another by greater than or equal to a threshold or relative amount, as discussed elsewhere herein. Responsive to matching data blocks, some data deduplication techniques may store a respective reference block in a storage device 102 in place of one or more matched data blocks and may store a data block, in its entirety, in the storage device(s) 102 responsive to non-matching data blocks, as discussed elsewhere herein.

In some embodiments, storage controller 104 may identify a matched data chunk as an alignment data chunk. Subsequent to performing a data deduplication technique on an alignment data chunk and/or responsive to identifying an alignment data chunk, storage controller 104 estimate subsequent/next data chunks. For instance the storage controller 104 may anticipate the identity of one or more subsequent/next data chunks and the order or sequence in which the subsequent data chunk will be received based on the alignment data chunk. For instance, since the alignment data chunk can indicate the beginning of a known or predetermined sequence of data chunks, storage controller 104 can use the sequence number of the alignment data chunk to determine and/or anticipate the next data chunk(s) that may be received via their respective sequence numbers in relation to the alignment data chunk and/or each other.

Responsive to anticipating/estimating receipt of one or more subsequent/next data chunk in a particular sequence, storage controller 104 can identify a reference chunk 122 corresponding to the next data chunk in the sequence with respect to the alignment chunk, which can be referred to herein as the next reference chunk 122 with respect to the reference chunk 122 for the alignment data chunk. Storage controller 104 may perform the data deduplication technique on the next data chunk utilizing the next reference chunk 122, as discussed elsewhere herein.

In various embodiments, storage controller 104 may determine a deduplication ratio for the deduplication technique performed on the next data chunk. A deduplication ratio may measure the overall reduction ratio achieved by a reference chunk 122. In some embodiments, a deduplication ratio factor may be computed by taking into account the average space consumption savings achieved on a storage device 102 due to deduplication against a data chunk. A higher ratio may be an indication that a greater amount of storage space is being saved on storage devices 102 by using a reference chunk 122 and that it may be desirable to continue using this particular reference chunk 122 at this point in a particular sequence.

Further, a deduplication ratio can be used as a metric in determining the quality of the deduplication technique performed on the next data chunk. For instance, a deduplication ratio greater than or equal to a predetermined value may indicate that the next reference chunk 122 was a good match for the next data chunk, while a deduplication ratio less than the predetermined value may indicate that the next reference chunk 122 was a poor match for the next data chunk. In some embodiments, a predetermined value for a deduplication ratio may be in the range of about 0.3 to about 1.0, among other values/ratios that are possible and contemplated herein.

Responsive to a deduplication ratio being less than a predetermined value (e.g., a poor match), storage controller 104 may compare a chunk signature for the next data chunk with respect to the next data chunk (e.g., a next, next data chunk with respect to the alignment data chunk) to the set of reference chunk signatures 124 in the reference chunk database 120 to determine if there is a match and repeat the subsequent operations, as discussed elsewhere herein. Responsive to a deduplication ratio being greater than or equal to a predetermined value (e.g., a good match), storage controller 104 may identify a next reference chunk 122 with respect to the next reference chunk 112 (e.g., a next, next reference chunk 122 with respect to the reference chunk 122 corresponding to the alignment data chunk) and perform the data deduplication technique on the next, next data chunk utilizing the next, next reference chunk 122, as discussed elsewhere herein, which can be repeated for each anticipated data chunk including a deduplication ratio greater than or equal to the predetermined value.

In various embodiments, storage controller 104 may manage the comparison blocks 114 in the primary database 110. Storage controller 104, in various embodiments, may select a set of comparison blocks 116 in the primary database 110 to function as an active set of comparison blocks 114, as discussed elsewhere herein.

Selection of a comparison block 114 for inclusion in some active sets may be based on a calculated score for one or more comparison blocks 114. In some embodiments, storage controller 104 may select for inclusion in a next (or subsequent) active set one or more comparison blocks 114 that includes a score that is greater than or equal to a threshold amount or relative score, which may be any suitable score and/or value.

A score for one or more comparison blocks 114 may be calculated based on one or more metrics. Non-limiting examples of a metric may include, but are not limited to, a logical block count (LBN) factor, a recent-lookup factor, and/or a deduplication ratio factor, etc., although other metrics are possible and contemplated herein.

Some LBN factors count the quantity of reference blocks in storage devices 102 that point to a data block represented by a comparison block 114. A comparison block 114 with a high LBN factor may be desirable for inclusion in an active set because an LBN factor can represent the quantity of data blocks that are being served by the data block that a particular comparison block 114 represents. In various embodiments, the higher the quantity, the more desirable it may be to include a particular comparison block 114 in an active set.

Some recent-lookup factors may measure the activity of one or more comparison blocks 114 in terms of LBN increments occurring within a predetermined period of time, which can include any amount or quantity of time. Various recent-lookup factors may identify whether a comparison block 114 is actively contributing towards deduplication of one or more incoming data streams 50. A higher recent-lookup factor or number can be an indication that a comparison block 114 is actively contributing to an overall deduplication technique. In various embodiments, the higher the recent-lookup factor, the more desirable it may be to include a particular comparison block 114 in an active set.

In various embodiments, the number of recent-lookup hits may not necessarily correspond to an LBN-count and vice-versa. For instance, a reference block 114 with a high LBN-count may have a low number recent-lookup hits, which may indicate that the comparison block 114 was once actively contributing towards overall deduplication, but may no longer doing so. A comparison block 114 with a low LBN-count, but a high number recent-lookup hits may be an indication that a comparison block 114 is actively contributing towards serving hot data (e.g., workloads where the LBNs are frequently being overwritten). Accordingly, some embodiments may provide offsetting weightings for an LBN factor and/or a recent-lookup factor.

Various deduplication ratio factors may measure the overall reduction ratio achieved by one or more comparison blocks 114. In some embodiments, a deduplication ratio factor may be computed by taking into account the average space consumption savings achieved on one or more storage devices 102 due to deduplication against one or more comparison blocks 114. A higher ratio may be an indication that a greater amount of storage space is being saved on the storage device(s) 102 by using a particular comparison block 114 and that it may be desirable to include this particular comparison block 114 in the active set.

A calculated score based on an LBN factor or count, a recent-lookup factor, and/or a deduplication ratio factor can be an approximation of the amount of space that is being saved in storage devices 102 due to deduplication of the data blocks in an incoming data stream 50 against a particular comparison block 114. Further, the score may be helpful in determining the usefulness of a particular comparison block 114. It should be understood that equivalent values for evaluating lookup factors, scores, ratios, and weights, etc., may be used (e.g., inverted scales and ratios, other suitable values that provide similarly functionality, etc.) without departing from the scope of this disclosure.

In some embodiments, an LBN factor, a recent-lookup factor, and/or a deduplication ratio factor may be provided greater weight in comparison to one or more of the other metrics. For example, a recent-lookup factor may be given greater weight than an LBN count and a deduplication ratio in calculating a score for one or more comparison blocks 114, which may be true when data in incoming data streams 50 is frequently changing. Greater weight may be given to an LBN count and/or a deduplication ratio factor in other possible scenarios that are contemplated herein.

Storage controller 104 may carry over one or more comparison blocks 114 included in the current active set to the next active set. In various embodiments, any quantity of comparison blocks 114 in the current active set may be carried to the next active set. In some embodiments, the quantity of comparison blocks 114 that may be carried over can be in the range of about two hundred (200) to about four hundred (400) comparison blocks 114, although other ranges and/or quantities are possible and contemplated herein.

In various embodiments, a comparison block 114 may be carried over based on its score relative to a median score for the comparison blocks 114 in an active set. For instance, when a score based on the above-referenced metrics is high enough for a comparison block 114 in the current active set, the comparison block 114 may be carried over for inclusion in the next active set.

In some embodiments, a comparison block 114 in a current active that includes a score that is greater than or relative to the median score may be carried over to the new active set. A score higher than a median score may be an indication that a comparison block 114 is contributing to data deduplication and that it may be desirable to continue using this comparison block 114. In further embodiments, a comparison block 114 with a score greater than about 80% of or relative to the median score may be carried over to the new active set, although other percentage and/or quantities are possible and contemplated herein.

Storage controller 104, in various embodiments, may promote one or more comparison blocks 114 not included in the current active set to the next active set. For instance, when a score based on the above-referenced metrics is high enough for a comparison block 114 that is not included in the current active set, the comparison block 114 may be included in the next active set. Accordingly, various embodiments of storage controller 104 may carry over one or more comparison blocks 114 in the current active set and promote one or more comparison blocks 116 not included in the current active set when selecting comparison blocks 114 for inclusion in the next active set.

In various embodiments, the total number of comparison blocks 114 that may be promoted may be about 20% of the total number of comparison blocks 114 in the primary database 110, although other percentages and/or quantities are possible and contemplated herein. In some embodiments, the total number of comparison blocks 114 that may be promoted may be about sixty-four (64) comparison blocks 114, although other quantities are possible and contemplated herein.

In some embodiments, storage controller 104 may demote or drop one or more comparison blocks 114 in the current active set from being included in the new active set. In further embodiments, storage controller 104 may uniformly spread any dropped comparison blocks 114 across the passive sets in the primary database 110.

In various embodiments, a comparison block 114 with a score that is not greater than or relative to the median score, as discussed elsewhere herein, may be dropped. In further embodiments, a comparison block 114 with a score that is not greater than about 80% of or relative to the median score, as discussed elsewhere herein, may be dropped, although other percentage and/or quantities are possible and contemplated herein.

Comparison blocks 114 that are too young or that were added too recently may not be considered for dropping in some embodiments. A comparison block 114 may be considered too young if an insufficient amount of amount of time has passed to determine its usefulness as a comparison block 114. A comparison block 114 that may be considered too young for dropping can be referred to herein as an immature comparison block 114.

In some embodiments, comparison blocks 114 that have been used for an amount of time sufficient to determine their usefulness as a comparison block 114 can be referred to herein as mature comparison blocks 114 and may be listed by their individual scores in descending order. A median score for the comparison blocks 114 may be calculated and a determination whether to carry over or drop a comparison block 114 or a mature comparison block 114 may be performed, as discussed elsewhere herein.

If a quantity of comparison blocks 114 is not dropped from the active set so that one or more new comparison blocks 114 cannot be included in the next active set, some embodiments may drop one or more comparison blocks 114 from the next active set. In some embodiments, comparison blocks 114 may be dropped beginning at the bottom of the list until a quantity of comparison blocks 114 equal to the quantity of new comparison blocks 114 may be dropped. In some embodiments, storage controller 104 may drop additional comparison blocks 114 beginning with the comparison block 114 with the lowest score and working upwards until a relative quantity of comparison blocks 114 may be dropped. In further embodiments, immature comparison blocks 114 may be excluded from being dropped by some techniques that begin dropping comparison blocks 114 based on scores beginning from the bottom score and working up.

A comparison block 114 remaining on the list or that was not dropped may be carried over for inclusion in the new active set. For instance, the number of slots freed up in the new active set (e.g., 20% of the total number of comparison blocks 114 in the primary database 110, among other example percentages and/or quantities) may be filled by promoted comparison blocks 114 and/or candidate comparison blocks 116, as discussed elsewhere herein. Further, when switching out of active sets, the quantity of new comparison blocks 114 that can be promoted to the new active set may be the same or substantially the same (e.g., with 10%) quantity as the number of comparison blocks 114 that are dropped from the previous active set, which may keep the quantity of comparison blocks 114 in the active set confined to a range.

Subsequent to creating a new active set, storage controller 104 may replace the current active set with the new active set, which operations can also be referred to herein in as switching or switching out active sets. In various embodiments, storage controller 104 may use the new active set in conjunction with the one or more data deduplication techniques in a manner similar to the previous active set.

In some embodiments, storage controller 104 may switch out active sets or retire an active set upon the occurrence of a predetermined event. Non-limiting examples of a predetermined event may include, but are not limited to, the expiration of a predetermined amount or quantity of time (e.g., about ten minutes, among other example quantities of time), receipt of a threshold amount or quantity of data blocks from client device(s) 25, a predetermined quantity of hits/matches of one or more comparison blocks 114 that are not included in the current active set, a predetermined quantity of hits/matches of one or more comparison blocks 114 that are not included in the current active set within a predetermined amount of time, and/or less than or equal to a predetermined number or relative number of hits/matches of one or more comparison blocks 114 in the current active set within a predetermined amount of time, etc., although other events are possible and contemplated herein.

In various embodiments, storage controller 104 may further maintain one or more active sets in the primary database 110 as passive set(s) upon retirement. In some embodiments, storage controller 104 may increment and/or decrement a counter associated with a comparison block 114 in a passive set based on various events. For instance, a counter for a comparison block 114 may be incremented when a new reference block points/refers to a data block represented by the comparison block 114. Further, a counter for a comparison block 114 may be decremented upon the occurrence of a predetermined event. Non-limiting examples of a predetermined event that may decrement a counter may include, but are not limited to, a situation in which one or more of the data blocks represented by a comparison block 114 in a particular passive set is deleted, is written over by new data (e.g., a new data block), a situation in which one or more comparison blocks 114 in a particular passive set no longer represent a valid or current data block etc., although other events are possible and contemplated herein.

Storage controller 104, in various embodiments, may delete and/or demote one or more comparison blocks 114 from the primary database 110. In some embodiments, storage controller 104 may delete one or more comparison blocks 114 in the primary database 110 that have been decremented to zero and/or include a counter with a zero count. In further embodiments, storage controller 104 may delete one or more comparison blocks 114 in the primary database 110 that are not included in any active set and/or any passive set. Storage controller 104 may delete a comparison block 114 upon deletion of a passive set including the comparison block 114, which may be the deletion of a lone passive set or a final passive set including the comparison block 114.

In some embodiments, storage controller 104 may delete one or more passive sets from the primary database 110. A passive set may be deleted when a respective counter associated with one or more comparison blocks 110 in the passive set is decremented to zero or includes a zero count. For instance, a passive set may be deleted from the primary database 110 when a counter associated with a final or last remaining comparison block 114 in the passive set is decremented to zero and/or the counter includes a zero count.

Further, a passive set may be deleted when the passive set includes less than a predetermined quantity of comparison blocks 114, which can be any quantity of comparison blocks 114. In some embodiments, prior to deletion of a passive set, each comparison block 114 in the passive set may be removed from the passive set and/or relocated to another passive set in the primary database 110.

In various embodiments, the deletion of one or more comparison blocks 114 from the primary database 110 and/or the deletion of one or more passive sets from the primary database 110 may be considered at least a portion of some global garbage collection techniques. Some global garbage collection techniques may free storage space in the primary database 110 so that more relevant and/or updated comparison blocks 114 and/or comparison sets (e.g., active sets and/or passive sets) may be added to and/or created in the primary database 110. Some global garbage collection techniques may free storage space in the primary database 110 by deleting/removing less relevant and/or outdated comparison blocks 114 and/or comparison sets from the primary database 110.

For a variety of reasons, it is possible that the amount of storage space in the primary database 110 that is available for storing comparison blocks 114 and/or comparison sets may go below a predetermined or threshold amount or may even go to zero. In some embodiments, a threshold value that triggers a global garbage collection technique may be eighty percent (80%) of the available space in the primary database 110 for storing comparison blocks 114 and/or comparison sets, although other percentages and/or quantities are possible and contemplated herein. In some embodiments, a threshold amount that can trigger a global garbage collection technique may be any percentage and/or quantity that maintains some amount of storage space that is less than 100% to provide an amount of reserve storage space to account for various scenarios in which extra storage space may be consumed.

Various global garbage collection techniques may be based on incoming data streams 50 overwriting the existing data blocks in storage devices 102 in a uniformly random order. In some embodiments, some oldest data blocks, which can be represented by the oldest passive sets, may have encountered more overwrites than some newer data blocks, which makes the older data blocks better candidates for garbage collection. As such, as some local garbage collection techniques relocate older data blocks first, data blocks represented by comparison blocks 114 in older passive sets may end up being automatically relocated. By the time a local garbage collection technique attempts to relocate newer data blocks and/or while newer passive sets are being created, some of the older comparison blocks 114 in older passive sets may have been deleted because there are no more data blocks in storage devices 102 being represented by these older comparison blocks 114. As such, some global garbage collection techniques and some local garbage collection techniques may be considered portions of the same garbage collection technique.

It is possible in some situations that the primary database 110 may no longer be able to accommodate any additional comparison blocks 114. For these unlikely situations, storage controller 104 may provide a forced garbage collection technique to delete/remove one or more passive sets and/or one or more comparison blocks 114 in the primary database 110 to free up space or create available storage space in the primary database 110.

In some embodiments, storage controller 104 may assign one or more comparison sets a sequence number that can be used to identify an order in time in which a comparison set was used as an active set. In some aspects, the higher the sequence number, the later it was used, although other sequencing techniques are possible and contemplated herein. The sequencing information can be used to find the number of data blocks that were represented by a particular comparison set.

In some forced garbage collection techniques, a passive set with the lowest sequence number (e.g., the oldest passive set) may be identified and deleted from the primary database 110 to free storage space in the primary database 110. In some aspects, the oldest passive set may be selected because it is likely to include the fewest number of comparison blocks 114 representing data blocks currently being pointed to a reference block. In various aspects, the immediately next higher sequence-numbered passive set may be identified and deleted when at least one more passive set is selected for deletion to free up a relative amount of storage space in the primary database 110.

In addition, various aspects may calculate the range of data blocks in storage devices 102 represented by the deleted passive set(s) and one or more data blocks in the range may be deleted. Further, the process of periodically checking whether it may be desirable to repeat the forced passive set deletion technique may be repeated. In some aspects, periodic checks may be performed by keeping track of the number of free slots available for storing passive sets in the primary database 110.

It is possible that, in the event that the above forced passive set deletion situation is detected, a local garbage collection technique over the data blocks in storage devices 102 is also currently/simultaneously in progress. In this situation, performing both the local garbage collection technique and the forced garbage collection technique of the comparison sets are important. In some embodiments, a local garbage collection technique may be assigned a higher priority than a forced garbage technique because the local garbage collection technique can directly affect the ability of storage controller 104 and storage devices 102 to continue storing data blocks. In other words, a forced garbage collection technique may be utilized to make storage system 100 more efficient, but storage system 100 may be able to continue running, albeit less efficiently, without implementing a forced garbage collection technique.

In various embodiments, storage controller 104 may allow a forced garbage collection technique to run unthrottled when a local garbage collection technique is not being performed, which can allow one or more comparison sets in the primary database 110 to be deleted/removed from the primary database 110 at an earlier time or an earliest possible time to free up or make available storage space in the primary database 110 to store comparison blocks 114. Further, storage controller 104 may throttle or operate at a reduced rate a forced garbage collection technique on comparison blocks 114 in the primary database 110 when a local garbage collection technique is being performed, which can reduce and/or minimize the impact of the forced garbage technique on the local garbage technique and yet provide progress towards freeing up of storage space for additional comparison sets and/or comparison blocks 114 in the primary database 110.

In additional or alternative embodiments, storage controller 104 may demote a comparison block 114 to a candidate comparison block 116 prior to deleting the comparison block 114 from the primary database 110. The candidate comparison block 116 resulting from the demoted comparison block 116 may be placed in any of the auxiliary databases 112a . . . 112n in accordance with the hierarchical order, as discussed elsewhere herein.

Storage controller 104, in various embodiments, may add one or more comparison blocks 114 to the primary database 110. In some embodiments, an added comparison block 114 may be a candidate comparison block 116 promoted from an auxiliary database 112 (e.g., auxiliary database 112a).

In various embodiments, storage controller 104 may manage the candidate comparison blocks 116 in the auxiliary databases 112. Storage controller 104, in various embodiments, may further promote one or more candidate comparison blocks 116 in an auxiliary database 112 (e.g., auxiliary database 112n) to an auxiliary database 112 at higher level (e.g., auxiliary database 112a).

In some embodiments, storage controller 104 may provide and/or manage a counter associated with one or more candidate comparison blocks 116. Storage controller 104 may further increment an associated counter when data blocks in incoming data streams 50 match or hit a particular candidate comparison block 116. Further, storage controller 104 may determine the age of one or more candidate comparison blocks 116, which may be determined by, for example, a time stamp, among other examples.

In some aspects, a candidate comparison block 116 may be promoted when/if a counter associated with the candidate comparison block 116 is incremented to a threshold quantity within a predetermined amount of time, which may be any quantity within any amount of time. In various aspects, some candidate comparison blocks 116 may be promoted based on a calculation of the number of hits, an age metric, and/or other metrics, etc., although other metrics are possible and contemplated herein.

In various embodiments, threshold quantities of hits for promotion to a comparison block 116 or to an auxiliary database 112 at a higher level may be the same and/or different quantities. For instance, two or more threshold quantities may be the same quantity and/or two or more threshold quantities may be different quantities.

In various embodiments, storage controller 104 may determine whether a new candidate comparison block 116 can be added to an auxiliary database 112. Storage controller 104 may compare one or more data blocks in an incoming data stream 50 to the comparison blocks 114 in the primary database 110 and to the candidate comparison blocks 116 in the auxiliary databases 112. In various embodiments, storage controller 104 may create or generate a new candidate comparison block 116 in an auxiliary database 112 that represents a data block in an incoming data stream 50 when the data block does not match any of the comparison blocks 114 in the primary database 110 and does not match any of the candidate comparison blocks 116 in the auxiliary databases 112.

In various embodiments, a data block in an incoming data stream matches a comparison block 114 or a candidate comparison block 116 when a predetermined quantity of signatures or fingerprints for the data block overlaps or matches signatures or fingerprints for a comparison block 114 or a candidate comparison block 116. In some embodiments, a predetermined quantity of overlapping/matching signatures or fingerprints may be in the range of three (3) to six (6) signatures or fingerprints (e.g., out of 8), among other ranges and/or quantities that are possible and contemplated herein.

In some embodiments, new candidate comparison blocks 116 may be added to the auxiliary database 112 at the lowest level in the hierarchical order (e.g., auxiliary database 112n). In further embodiments, new candidate comparison blocks 116 may be added to an auxiliary database 112 at any level or at a default level in the hierarchical order, among other possibilities that are contemplated herein.

Storage controller 104, in various embodiments, may delete a candidate comparison block 116 from an auxiliary database 112. In some embodiments, a candidate comparison block 116 may be removed in response to a predetermined event. Non-limiting examples of a predetermined event may include, but are not limited to, an auxiliary database 112 having less than a predetermined threshold amount or relative amount of available storage space, a candidate comparison block 116 with a counter that is not incremented to a predetermined quantity within a predetermined amount of time, and/or a candidate comparison block 116 that has aged beyond a predetermined threshold age, etc., although other events are possible and contemplated herein.

In some embodiments, if attempts to identify candidate comparison blocks 116 for deletion do not free up a sufficient amount of storage space in an auxiliary database 112 to reduce the consumption of storage space below a predetermined threshold amount, storage controller 104 may more aggressively remove one or more candidate comparison blocks 116. A non-limiting example of more aggressively removing one or more candidate comparison blocks 116 may include, but is not limited to, reducing the age threshold and deleting candidate comparison block(s) 116 that are less than or equal to the reduced or relative age, among other possible examples that are contemplated herein. Reducing the threshold age can be repeated until a relative amount (e.g., sufficient amount) of storage space is made available in an auxiliary database 112 and/or may be performed a predetermined number of times, which may be any quantity. In some embodiments, the reduction of age threshold may include deleting candidate comparison blocks 116 that have aged beyond the lower age threshold, even if they are otherwise promotable. More aggressively removing one or more candidate comparison blocks 116 may further include deleting immature candidate comparison blocks 116 that do not include a high enough calculated score to be promotable.

In the unlikely event that the more aggressive removal operations do not free up a relative (e.g., sufficient, needed, desired, etc.) amount of space in an auxiliary database 112, storage controller 104 may cease the deletion operations and reschedule resumption of the deletion operations at a later time, which may include a time when one or more immature candidate comparison blocks 116 may become mature candidate comparison blocks 116. For instance, in the time from the cessation of deletion operations to the resumption of deletion operations in an auxiliary database 112, an attempt to add new candidate comparison blocks 116 to an auxiliary database 112 may fail or may not be otherwise attempted, as applicable.

In additional or alternative embodiments, storage controller 104 may demote a candidate comparison block 116 to an auxiliary database 112 that is at a lower level in the hierarchical order (e.g., auxiliary database 112n) prior to deleting the candidate comparison block 116 from an auxiliary database 112 that is at a higher level (e.g., auxiliary database 112a). In some embodiments, storage controller 104 may relocate the demoted candidate comparison block 116 to an auxiliary database 112 at a next lower level, an intermediate lower level, a lowest level, a default level in the hierarchical order prior to deletion from an auxiliary database 112 at a higher level. Further, storage controller 104 may delete a candidate comparison block 116 from memory 108 that is being demoted from an auxiliary database 112 at the lowest level of the hierarchical order (e.g., auxiliary database 112n).

In various embodiments, an auxiliary database 112 at each level of the hierarchical order may filter the candidate comparison blocks 116 that are demoted from the level above it and accept a subset of those candidate comparison blocks 116 that satisfy one or more criteria for acceptance to ensure that demoted candidate comparison blocks 116 represent different data (e.g., in terms of their signature overlaps) so that the demoted candidate comparison blocks 116 can potentially cover a widest possible variation in data patterns. In some embodiments, storage controller 104 may categorize the candidate comparison blocks 116 identified for demotion into different groups in which each group includes similar data with a minimum predetermined quantity of overlapping signatures or fingerprints, which may be any suitable quantity of overlapping signatures/fingerprints, and can be used to define a signature for the group. In some embodiments, a minimum predetermined quantity of overlapping signatures/fingerprints may be in the range of about three (3) to about six (6) overlapping signatures/fingerprints (e.g., out of 8), among other possibilities that are contemplated herein. In additional or alternative embodiments, a minimum predetermined quantity of overlapping signatures/ fingerprints for identifying/defining a group may be less than the predetermined quantity of overlapping or matching signatures/fingerprints used to identify matched data blocks when creating the candidate comparison blocks 116 in memory 108.

After the groups are identified, the candidate comparison blocks 116 in each group may be sorted and the candidate comparison block 116 with the largest score or counter incremented to the highest count compared to the other candidate comparison blocks 116 in its group (e.g., the top candidate comparison block 116 for a group) may be added/demoted to the auxiliary database 112 at the lower level, with the remaining candidate comparison blocks 116 in each group being deleted from memory 108. This technique can result in a reduction in the quantity of candidate comparison blocks 116 in memory 108 and may still cover a majority of the data patterns in the incoming data streams 50.

In various embodiments, one or more candidate comparison blocks 116 from an auxiliary database 112 may need to be deleted in accordance with at least a portion of a global garbage collection technique performed by storage controller 104. For instance, storage space in an auxiliary database 112 may need to be freed up so that more relevant and/or updated candidate comparison blocks 116 can be added to the auxiliary database 112.

Storage controller 104, in performing some global garbage collection techniques on an auxiliary database 112, may group the candidate comparison blocks 116 in an auxiliary database 112 based on the quantity of overlapping signatures/fingerprints and the top candidate comparison block 116 for each group can be identified, as discussed elsewhere herein. Storage controller 104 may list the groups in descending order based on the quantity of candidate comparison blocks 116 in each group. Should two or more groups include the same quantity of candidate comparison blocks 114, the groups can be ordered in accordance with their overall scores based on the cumulative scores/counts of each candidate comparison block 116 in a group, with groups including higher overall scores placed earlier in the sorted order.

The top candidate comparison block 116 in each block may be retained in the auxiliary database 112 with the remaining non-top candidate comparison blocks 116 being deleted from the auxiliary database 112. Some global garbage collection techniques may begin deleting candidate comparison blocks 116 starting with the group at the top of the list and working down the list retaining the top candidate comparison block 116 and deleting the other candidate comparison blocks 116 in a group until a relative (e.g., sufficient, needed, desired, etc.) amount of space is freed up or each group has been reduced/deleted so that its top candidate comparison block 116 remains in the auxiliary database 112.

Combining some global garbage collection techniques with the hierarchical order of the auxiliary databases 112 in which each successive lower level being an instance of the top level (e.g., auxiliary database 112a), can create relatively criteria for admission and removal of candidate comparison blocks 116 such that the rate of flow of candidate comparison blocks 116 into and/or out of an auxiliary database 112 may be reduced to a fraction of the level above it. As a result, a window of time for capturing new data chunks and/or data blocks that are to be written to storage device 102 that may match data chunks and/or data blocks already stored in storage devices 102 and corresponding to candidate comparison blocks 116 in an auxiliary database 112 at a particular level can essentially be a multiple of the window of time for capturing matched data chunks and/or data blocks for one or more levels above the particular level.

Figure 5:
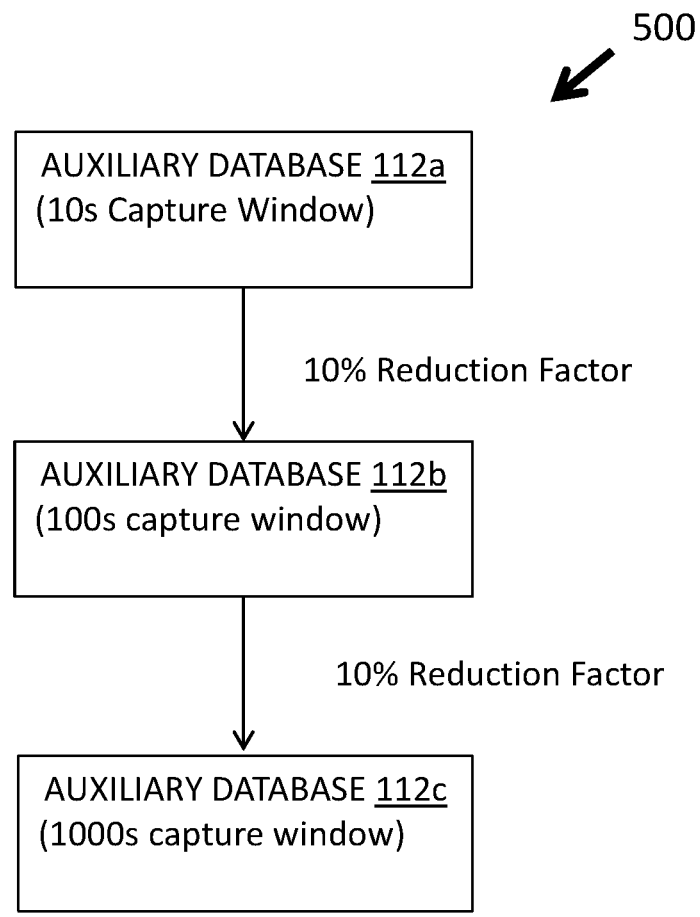
FIG. 5 is a block diagram of example auxiliary databases arranged in a hierarchical order.

Various embodiments may include a plurality of levels and an efficient garbage collection technique/filter to create a suitable reduction-factor between successive levels that can exponentially expand the overall time-window for capturing new data chunks and/or data blocks in incoming data steams 50 that match data chunks and/or data blocks currently stored in storage devices 102. In an example system 500 illustrated in FIG. 5, a set of auxiliary databases 112a, 112b, and 112c arranged in a hierarchal order including three (3) levels in which each level has a reduction factor of ten percent (10%) (e.g., uses a garbage collection technique that accepts ten percent of the candidate comparison blocks 116 from a higher level), can provide a capture window of time that is ten (10) times slower than the level immediately above it and ten (10) times faster than the capture window of time below it. Accordingly, the auxiliary database 112c at lowest level in the three-level hierarchical order of this example can include a capture window that is ten (10) times longer than the auxiliary database 112b at the intermediate level and one hundred (100) times longer than the auxiliary database 112a at the highest level. For aspects in which the top-level includes a capture window of about 10 seconds, the auxiliary database 112b can provide a capture window of about one hundred (100) seconds and the auxiliary database 112c can provide a capture window of about one thousand (1000) seconds. This hundred-fold increase from ten seconds to one thousand seconds may be achieved with a three-fold increase in the size of memory 108 and may be scalable in accordance with a particular application. As such, various embodiments of system 500 may include any suitable quantity of auxiliary databases 112 arranged in any suitable quantity of levels with any suitable reduction factor and/or suitable capture window of time, and, as such, are not limited to the system 500.

In some embodiments, storage controller 104 may determine if/when it may be desirable to free space in one or more segments of storage devices 102. For example, storage controller 104 can determine that an incoming data stream 50 may consume a certain quantity of memory space in a storage device 102 and that there is not a sufficient amount of contiguous data space in a or any one segment to accommodate the incoming data stream 50, which may trigger a desire to free storage space in a segment to create a corresponding amount of contiguous free data space so that the incoming data stream 50 may be accommodated.

In various embodiments, storage controller 104 may further implement a local garbage collection technique to assist in freeing up storage space in a storage device 102. Storage controller 104 may utilize some local garbage collection techniques to more efficiently utilize storage space in storage devices 102 by relocating data chunks and/or data blocks stored in the segments to other locations when/if there may be a desire to free storage space in a segment.

A local garbage collection technique, in various embodiments, may include a respective counter associated with the segments in storage devices 102 and may utilize the counter to track a quantity of valid data blocks in its associated segment. In various embodiments, a valid data chunk or data block can be a data chunk or data block that includes the data originally written to a segment or data in a segment that has not been over-written with new data.

In some embodiments, storage controller 104 may utilize the counters associated with the segment(s) to select a victim segment, which can be a segment within which it may be desirable to free data space. A victim segment may be selected based on the quantity of valid data blocks in one or more segments, as tracked by the counters. In some embodiments, storage controller 104 may select the segment with the fewest number or quantity of valid data blocks as a victim segment. For instance, storage controller 104 may select the segment with an associated counter including the lowest count value as the victim segment.

Storage controller 104, in various embodiments, may relocate one or more valid data chunks or data blocks in the victim segment. In some embodiments, storage controller 104 may read a valid data chunk or data block in a victim segment to cache memory device 118 and subsequently write the valid data chunk or data block to a new location in storage devices 102. Some valid data chunks or data blocks that are adjacent, temporally close, or proximate to one another in a victim segment may be written/re-written to new locations in the same segment, while other valid data chunks and/or data blocks may be written/re-written to new locations in a different segment. A new location for some valid data chunks or data blocks written/re-written to the same segment that the valid data block(s) were read from (e.g., the victim segment) may be selected so that a sufficient amount of contiguous storage space in the victim segment is freed up to accommodate one or more, each, etc., of the data chunks and/or data blocks in an incoming data stream 50.

Some segments becoming a victim for garbage collection can imply that alignment chunks in a victim segment including corresponding reference chunks 122 should be handled before the segment can be erased. In some embodiments, an alignment chunk that includes valid (e.g., non-garbage) data above a predetermined threshold amount (e.g., 10%) may be relocated to a new location in the storage devices 102 with its sequence number preserved. In additional or alternative embodiments, an alignment chunk that includes a relatively small percentage of valid data (e.g., less than 10%) may have each reference block corresponding to the alignment chunk sorted based on their respective amounts valid data and a quantity reference blocks with highest amount of valid data may be selected as the new reference chunk 122, which can be any suitable quantity, and the remaining reference blocks may be re-encoded against the new reference chunk 112 and stored in a new location in the storage devices 102.

In some embodiments, storage controller 104 may read and write/re-write one or more valid data chunks and/or data blocks utilizing a Moved-Compressed technique. Some Moved-Compressed techniques may include operations that perform raw or basic read operations to read compressed data chunks and/or data blocks in the segments to cache memory device 118 followed by operations that perform raw or basic write operations to write the compressed data chunks and/or data blocks from cache memory device 118 back to a segment in storage devices 102. Various Moved-Compressed techniques can be implemented in conjunction with a data deduplication technique if/when one or more of compressed data chunks and/or data blocks being relocated is/are a reference chunk 122 or reference block that relies on a data block that continues to be available in cache memory device 118 and/or storage devices 102.

Storage controller 104, in some embodiments, may read and write/re-write one or more valid data chunks and/or data blocks utilizing a Compression-as-part-of-Relocation technique. Some Compression-as-part-of-Relocation techniques may include operations that initially write one or more data chunks and/or data blocks to the segments in storage devices 102 in an uncompressed form. Subsequently, a local garbage collection technique consistent with the various embodiments discussed above may be performed to free storage space in a victim segment (e.g., reduce the quantity of data in the victim segment and/or create a larger amount of contiguous storage space in the victim segment). Various Compression-as-part-of-Relocation techniques may further include operations to read one or more valid data chunks and/or data blocks, which are in uncompressed form, in the victim block to cache memory device 118, compress one or more valid data chunks and/or data blocks to create a respective compressed data chunks and/or data block, and write one or more compressed data chunks and/or data blocks to a new location in storage devices 102 (e.g., a write/re-write to the victim segment or to a different segment). In various embodiments, the Compression-as-part-of-Relocation technique can improve the visible latency for a user of storage system 100 because the local garbage collection technique may be a background process.

In various embodiments, storage controller 104 may read and write/re-write one or more valid data chunks and/or data blocks utilizing a Re-encode technique, which can also be referred to as a Re-compress technique and/or a Re-deduplication technique. Some Re-encode techniques may include operations that read one or more compressed valid data chunks and/or data blocks to cache memory device 118 and decompresses one or more of the compressed valid data chunks and/or data blocks, which can be considered part of the read operations or separate operations, to create one or more decompressed valid data chunks and/or data blocks in cache memory device 118. Moreover, various Re-encode techniques may include operations that compress (e.g., re-compress) one or more of the decompressed valid data chunks and/or data blocks in cache memory device 118 and operations to perform write operations to write the re-compressed valid data blocks to the segments in storage devices 102. In some embodiments, the operations to re-compress the decompressed valid data chunks and/or data blocks can be considered part of the write operations, while in other embodiments the operations to re-compress the decompressed valid data blocks may be considered separate operations. Some Re-compress techniques allow for multiple-use cases, some examples of which are discussed below, among other example multiple-use cases.

Some Re-encode techniques may utilize Recompress-With-Different-Algorithm operations when relocating valid data chunks and/or data blocks. In various embodiments, two or more different compression algorithms may be used to compress data chunks and/or data blocks when the data chunks and/or data blocks are written to storage devices 102. In some embodiments, a first compression technique that provides faster compression of the data chunks and/or data blocks and a second compression technique that provides a better compression factor may be utilized. In some aspects, a faster compression technique may be utilized to compress the data chunks and/or data blocks when the data chunks and/or data blocks are initially written to storage devices 102 to provide better latency and subsequently the data chunks and/or data blocks are decompressed and then re-compressed using a compression technique with a better compression factor during a local garbage collection technique to improve the compression ratio of the data chunks and/or data blocks in storage devices 102.

Since some data deduplication techniques may perform more effectively when a larger amount of data is used for compression because larger amounts of data can provide a greater number of available patterns of data chunks and/or data blocks, some Re-encode techniques may utilize Recompress-With-Additional-Data operations when relocating valid data chunks and/or data blocks. In some aspects, one or more additional data chunks and/or data blocks may be added to the quantity of data chunks and/or data blocks during a compression algorithm. In various aspects, multiple logically-consecutive data chunks and/or data blocks may be included with a local garbage collection technique to improve the compression ratio of the data stored in storage devices 102.

Utilizing some Re-encode techniques as part of relocation write operations can provide various benefits. In various Re-encode techniques, it is possible that a more accurate active set of comparison blocks 114 may be available at the time of a relocation write, which can provide improved reduction ratios in storage devices 102. In some Re-encode techniques, a re-encoding step may refer to a new active set, which can diminish a desire to store one or more passive sets in the primary database 110 and may allow for a natural evolution of active sets and/or may help remove one or more passive sets from the primary database 110.

By utilizing network 106, storage system 100, in various embodiments, can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/ or or sets of computing devices connected together for the purpose of sharing resources.

Figure 6:
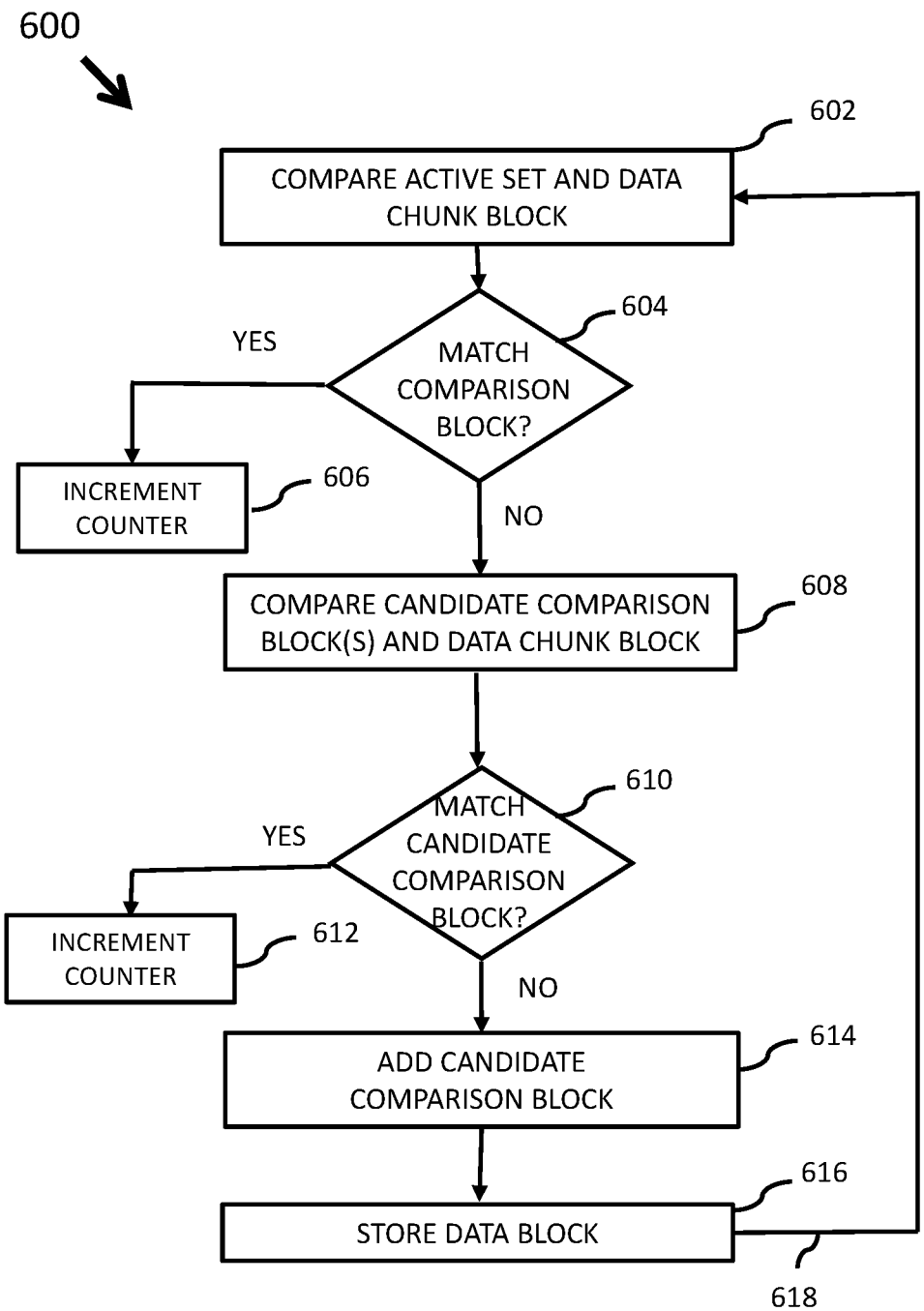
FIG. 6 is a flow diagram of an example method for data deduplication on data blocks.

With reference to FIG. 6, FIG. 6 is a flow diagram of an example method 600 for data deduplication in a storage system 100. As shown, some embodiments of method 600 may begin by a storage controller 104 comparing a data block in an incoming data stream 50 and an active set of comparison blocks 114 (block 602) to determine if the data block matches one or more of the comparison blocks 114 (block 604). A match may be determined responsive to the data block in the incoming data stream 50 matching a threshold quantity of signatures/fingerprints of a comparison block 114, as discussed elsewhere herein.

Responsive to a match (e.g., a YES in block 604), the storage controller 104 may increment a counter associated with the matched comparison block 114 (block 606). Responsive to non-matches (e.g., a NO in block 604), the storage controller 104 may compare the data block in the incoming data stream 50 to one or more candidate comparison blocks 116 (block 608) to determine if there is a match (block 610). A match may be determined responsive to the data block in the incoming data stream 50 matching a threshold quantity of signatures/fingerprints of a candidate comparison block 116, as discussed elsewhere herein.

Responsive to a match (e.g., a YES in block 610), a counter associated with the matched candidate comparison block 116 may be incremented (block 612). Responsive to a non-match (e.g., a NO in block 610), a new candidate comparison block 116 may be added to or created in an auxiliary database 112 (block 614).

In various embodiments, the storage controller 104 may further store the unmatched data block in the storage device (s) 102 (block 616). The storage controller may then repeat blocks 602 through 616 for a subsequent data block (return 618).

Figure 7:
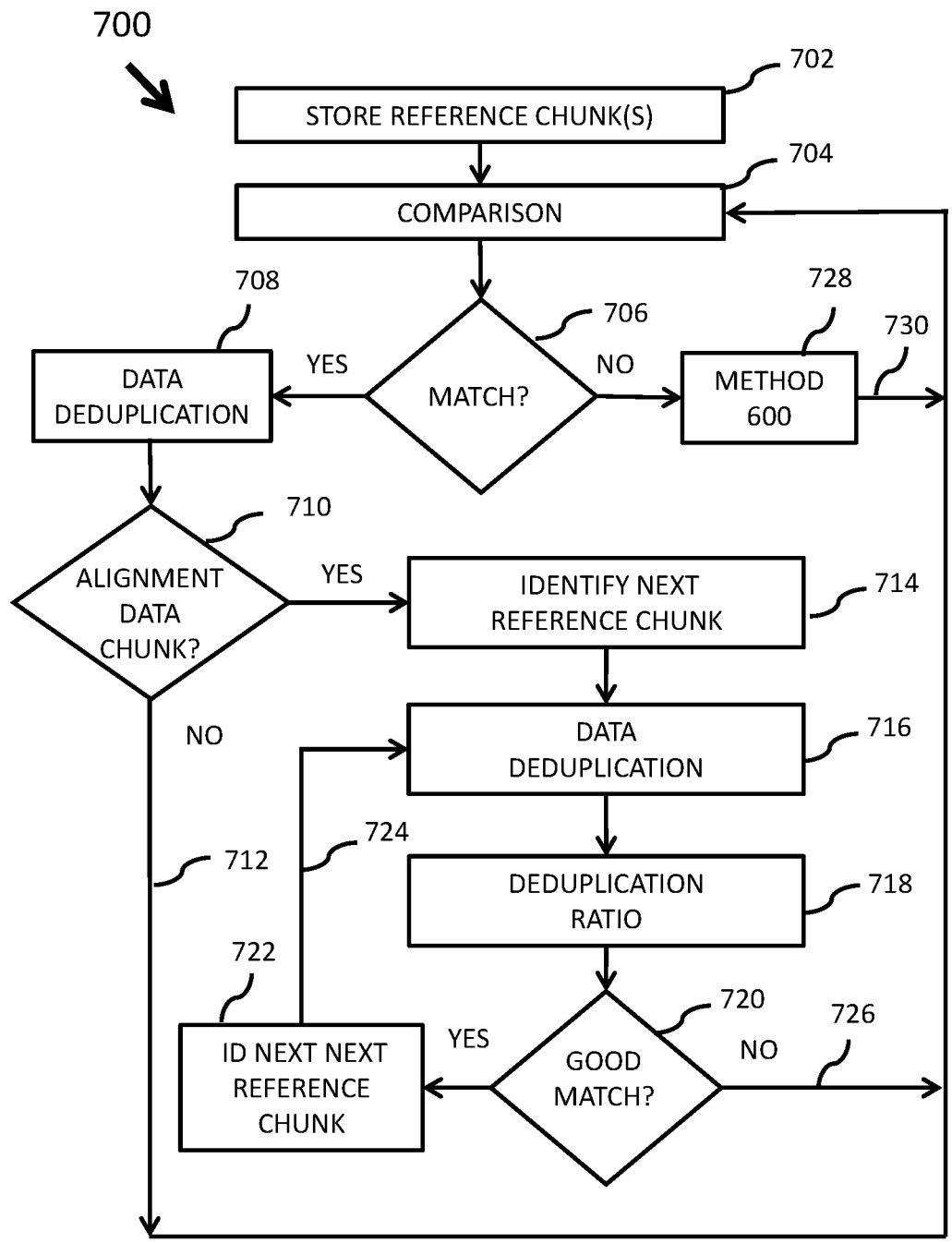
FIG. 7 is a flow diagram of an example method for data deduplication on data chunks.

FIG. 7 is a flow diagram of an example method 700 for data deduplication in a storage system 100. As shown, some embodiments of method 700 may begin by a storage controller 104 storing a set of one or more reference chunks 122 (block 702), which can include reference signatures 124. In various embodiments, the reference chunk(s) 122 may be stored in the storage controller 104, a cache memory device 118, and/or a reference chunk database 120, as discussed elsewhere herein.

The storage controller 104 may compare a data chunk in an incoming data stream 50 to the set of reference chunks 122 (block 704) to determine if the data chunk matches one or more of the reference chunks 122 (block 706). A match may be determined responsive to a chunk signature matching a reference signature 124 associated with a reference chunk 122, as discussed elsewhere herein. For instance, responsive to a predetermined quantity of overlapping fingerprints in the chunk signature and a reference signature 124 associated with a particular reference chunk 122, as discuss elsewhere herein.

Responsive to matching signatures (e.g., a YES in block 706), the storage controller 104 may perform a data deduplication technique on the data chunk utilizing the matched reference chunk 122 (block 708). The storage controller 104 may determine if the data chunk is an alignment data chunk (block 710). Responsive to determining a non-alignment chunk (e.g., a NO in block 710), the storage controller 104 may perform the operations of block 704 on a next data chunk (return 712).

Responsive to determining an alignment chunk (e.g., a YES in block 710), the storage controller 104 may anticipate receipt of one or more data chunks in a particular sequence and identify a reference chunk (e.g., a next reference chunk 122) corresponding to a next data chunk in the sequence (block 714). The storage controller 104 may perform the data deduplication technique on the next data chunk utilizing the next reference chunk 122 (block 716). A deduplication ratio may be calculated for the data deduplication technique based on the next reference chunk 122 (block 718) to determine if the next reference chunk 122 was a good match (block 720).

Responsive to a good match (e.g., a YES in block 720), the storage controller may identify a reference chunk 122 (e.g., a next, next reference chunk 122) corresponding to a next, next data chunk in the sequence (block 722) and perform the operations in block 716 (return 724). The operations in the above blocks may be repeated until the determination in block 720 is negative. Responsive to a poor match (e.g., a NO in block 720), the storage controller 104 may perform the operations of block 704 on the next, next data chunk (return 726).

Responsive to non-matching signatures (e.g., a NO in block 706), the storage controller 104 may perform the data deduplication technique 600 on the data chunk (block 728). The storage controller 104 may perform the operations of block 704 for a next data chunk (return 730).

Figure 8:
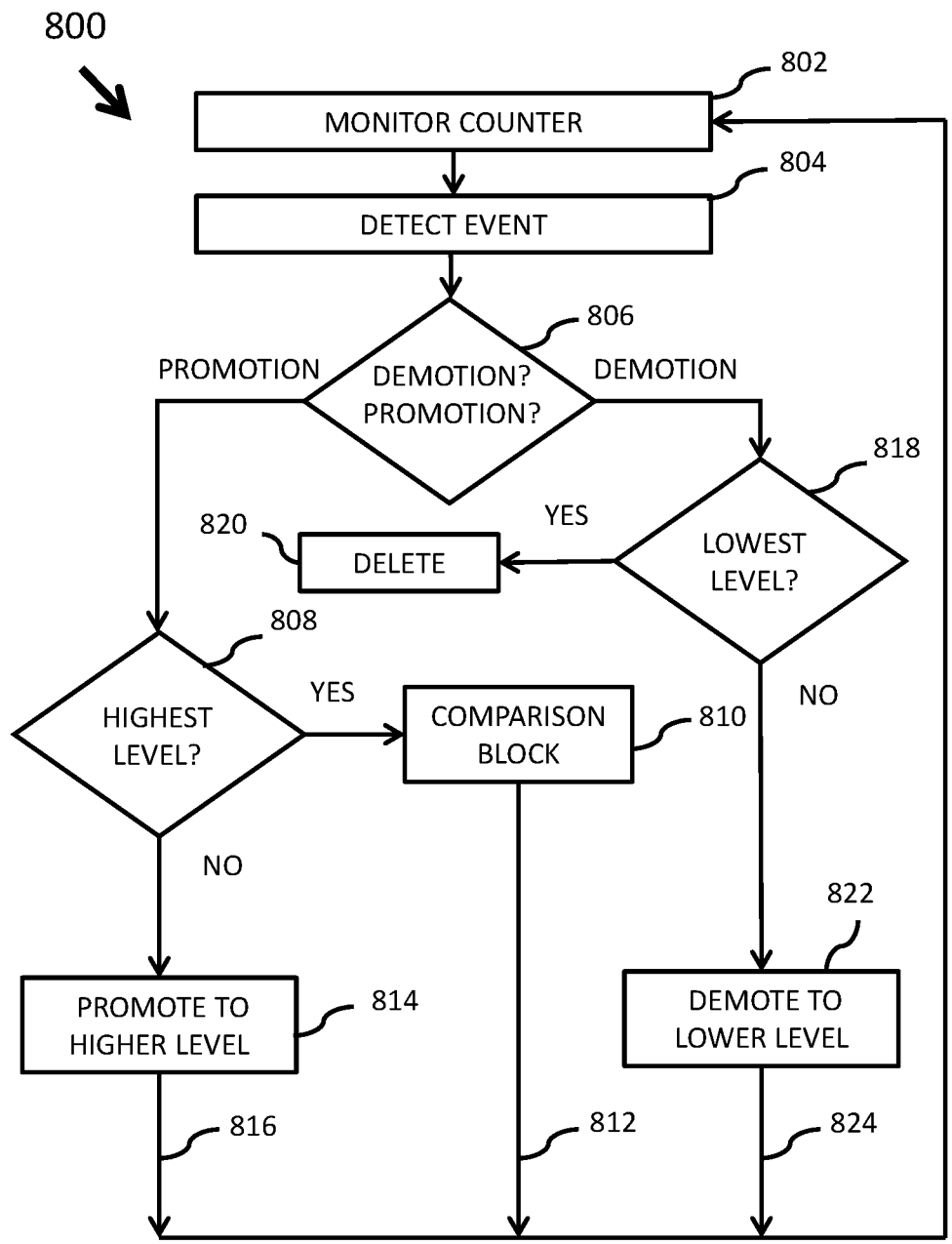
FIG. 8 is a flow diagram of an example method for promoting/demotion candidate comparison blocks.

Referring now to FIG. 8, an example method 800 for promoting/demoting candidate comparison blocks 116 in a storage system 100 is illustrated. As illustrated, method 800 may begin by a storage controller 104 monitoring a counter associated with a candidate comparison block 116 in an auxiliary database 112 at a first level of a hierarchical order (block 802).

The storage controller 104 may detect an event for the candidate comparison block 116 (block 804) and determine if the event is a promotion event or a demotion event (block 806).

In various aspects, a promotion event may include the counter associated with the candidate comparison block 116 exceeding a threshold quantity of hits, exceeding a threshold quantity of hits within a predetermined amount of time, an age metric, and/or other metric(s), etc., as discussed elsewhere herein. In further aspects, a demotion event may include the counter associated with the candidate comparison block 116 not exceeding a threshold quantity of hits, not exceeding a threshold quantity of hits within a predetermined amount of time, an age metric, and/or other metric(s), etc., as discussed elsewhere herein.

Responsive to a promotion event, the storage controller 104 may determine if the candidate comparison block 116 is located in an auxiliary database 112 at the highest level of the hierarchical order (block 808). Responsive to being located in an auxiliary database 112 at the highest level (e.g., a YES in block 808), the storage controller 104 can promote the candidate comparison block 116 to a comparison block 114 (block 810) and return to monitoring the counter (return 812). Responsive to not being located in an auxiliary database at the highest level (e.g., a NO in block 808), the storage controller can promote the candidate comparison block 116 to an auxiliary database 112 at the next higher level in the hierarchical order (block 814) and continue monitoring the counter (return 816).

Responsive to a demotion event, the storage controller 104 may determine if the candidate comparison block 116 is located in an auxiliary database 112 at the lowest level of the hierarchical order (block 818). Responsive to being located in an auxiliary database 112 at the lowest level (e.g., a YES in block 818), the storage controller 104 can delete the candidate comparison block 116 from the storage system 100 (block 820). Responsive to not being located in an auxiliary database 112 at the lowest level (e.g., a NO in block 818), the storage controller 104 can demote the candidate comparison block 116 to an auxiliary database 112 at the next lower level in the hierarchical order (block 822) and continue monitoring the counter (return 824).

While at least one exemplary embodiment has been presented in the foregoing detailed description of the technology, it can be appreciated that a vast number of variations may exist. It can also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of a hardware embodiment, a software embodiment (including firmware, resident software, micro-code, etc.), or a combination of hardware and software aspects that may generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, RAM, ROM, an EPROM, an EEPROM, a Flash memory, an optical fiber, a CD-ROM, an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that one or more blocks of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It can also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A non-volatile memory system, comprising:
a non-volatile cache memory device to store a set of chunk reference signatures; and
a storage controller coupled to the non-volatile cache memory device and including one or more processors that execute instructions in one or more programs, causing the storage controller to perform operations comprising:
receiving a first data chunk including a first set of data blocks;
determining a first data chunk signature for the first data chunk;
comparing the first data chunk signature and the set of chunk reference signatures to determine a first match between the first data chunk signature and a first chunk reference signature from the set of chunk reference signatures;
responsive to determining the first match, identifying a first reference data chunk associated with the first chunk reference signature, the first reference data chunk including a first set of comparison blocks, wherein a comparison block in the first set of comparison blocks is a representation of a stored data block and is used to determine a match;
performing a deduplication technique on a subset of data blocks in the first set of data blocks that match one or more comparison blocks in the first set of comparison blocks, wherein a match between a data block and a comparison block is determined if at least 30% and less than 100% of fingerprints corresponding to the data block match fingerprints corresponding to the comparison block; and
identifying a second reference data chunk based on identifying the first reference data chunk.

2. The non-volatile memory system of claim 1, wherein:
the second reference data chunk is a next sequential reference data chunk with respect to the first reference data chunk; and
identifying the second reference data chunk is based on the second reference data chunk being the next sequential reference data chunk with respect to the first reference data chunk.

3. The non-volatile memory system of claim 1, wherein:
the second reference data chunk includes a second set of comparison blocks; and
the operations further comprise:
receiving a second data chunk including a second set of data blocks;
performing the deduplication technique on the second set of data blocks based on the second set of comparison blocks;
determining a deduplication ratio for the second set of data blocks; and
identifying a third reference data chunk based on the deduplication ratio.

4. The non-volatile memory system of claim 3, wherein:
the third reference data chunk is identified responsive to the deduplication ratio being greater than a predetermined ratio; and
identifying the third reference data chunk comprises identifying a next sequential reference data chunk with respect to the second reference data chunk as the third reference data chunk.

5. The non-volatile memory system of claim 3, wherein the operations further comprise:
responsive to the deduplication ratio being less than a predetermined ratio:
receiving a third data chunk;
determining a second data chunk signature for the third data chunk; and
comparing the second data chunk signature and the set of chunk reference signatures to determine a second match; and
wherein identifying the third reference data chunk comprises associating a second data chunk reference signature that matches the second data chunk signature with the third reference data chunk.

6. The non-volatile memory system of claim 1, further comprising:
a non-volatile storage device coupled to the non-volatile cache memory device and the storage controller, wherein:
the non-volatile storage device comprises a primary database storing an active set of comparison blocks; and
the operations further comprise:
loading the active set of comparison blocks to the cache memory device; and
performing the deduplication technique on the first set of data blocks utilizing the active set of comparison blocks.

7. The non-volatile memory system of claim 6, wherein:
the non-volatile storage device further comprises a first auxiliary database; and
the operations further comprise creating first candidate comparison blocks in the first auxiliary database for non-matched data blocks in the first set of data blocks via the deduplication technique.

8. The non-volatile memory system of claim 7, wherein:
the non-volatile storage device further comprises a first set of global counters associated with the first candidate comparison blocks; and
the operations further comprise:
responsive to determining first matched data blocks in the first set of data blocks via the deduplication technique, incrementing first global counters in the first set of global counters for corresponding first candidate comparison blocks; and responsive to a first counter associated with a first particular candidate comparison block exceeding a first predetermined threshold count, promoting the first particular candidate comparison block in the first auxiliary database to a comparison block in a buffer memory.

9. The non-volatile memory system of claim 8, wherein:
the first candidate comparison blocks comprise respective second data signatures; and
the second data signatures are based on first fingerprints of the first candidate comparison blocks.

10. The non-volatile memory system of claim 9, wherein the second data signatures are further based on second fingerprints of the first fingerprints.

11. The non-volatile memory system of claim 8, wherein:
the non-volatile storage device further comprises:
 a second auxiliary database storing a set of second candidate comparison blocks; and
 a second set of global counters associated with second candidate comparison block signatures; and
the operations further comprise:
 responsive to determining second matched data blocks in the first set of data blocks via the deduplication technique, incrementing second global counters in the second set of global counters for corresponding second candidate comparison blocks; and
 responsive to a second counter associated with a second particular candidate comparison block exceeding a second predetermined threshold count, promoting the second particular candidate comparison block in the second auxiliary database to a first candidate comparison block in the first auxiliary database.

12. The non-volatile memory system of claim 11, wherein the operations further comprise:
performing a first garbage collection technique on the buffer memory to delete a first predetermined quantity of candidate comparison blocks from the buffer memory to create space for promoted first candidate comparison blocks; and
performing a second garbage collection technique on the first auxiliary database to delete a second predetermined quantity of first candidate comparison blocks to create space in the first auxiliary database for promoted second candidate comparison blocks; and
wherein the first garbage collection technique and the second garbage collection technique create a multi-layer mechanism that provides an exponential increase in matching opportunity for the deduplication technique.

13. The non-volatile memory system of claim 1, wherein the determining a first data chunk signature for the first data chunk comprises:
decomposing a data block of the first set of data blocks into one or more shingles; and
determining a hash value for at least one of the shingles, wherein the hash value acts as a fingerprint for the first data chunk signature.

14. A method, comprising:
storing, in a non-volatile cache memory device, a set of chunk reference signatures;
receiving a first data chunk including a first set of data blocks;
determining a first data chunk signature for the first data chunk;

comparing the first data chunk signature and the set of chunk reference signatures to determine a first match between the first data chunk signature and a first chunk reference signature;
responsive to determining the first match, selecting a first reference data chunk associated with the first chunk reference signature, the first reference data chunk including one or more comparison blocks, wherein a comparison block in the one or more comparison blocks is a representation of a stored data block and is used to determine a match;
performing a first instance of a deduplication technique on a subset of data blocks in the first set of data blocks that match the one or more comparison blocks in the first reference data chunk, wherein a match between a data block and a comparison block is determined when at least 30% and less than 100% of fingerprints corresponding to the data block match fingerprints corresponding to the comparison block;
anticipating a receipt of a first anticipated next sequential data chunk with respect to the first data chunk; and
selecting a first anticipated reference data chunk that is associated with the first anticipated next sequential data chunk.

15. The method of claim 14, further comprising:
receiving the first anticipated next sequential data chunk; and
performing a second instance of the deduplication technique on the first anticipated next sequential data chunk utilizing the first anticipated reference data chunk.

16. The method of claim 15, further comprising:
determining a deduplication ratio for the second instance of the deduplication technique, the deduplication ratio being greater than a predetermined ratio;
selecting a second anticipated reference data chunk that is associated with a second anticipated next sequential data chunk; and
performing a third instance of the deduplication technique on the second anticipated next sequential data chunk utilizing the second estimated reference data chunk.

17. The method of claim 15, further comprising:
determining a deduplication ratio for the second instance of the deduplication technique, the deduplication ratio being less than a predetermined ratio;
receiving a second data chunk;
determining a second data chunk signature for the second data chunk;
comparing the second data chunk signature and the set of chunk reference signatures to determine a second match; and
responsive to the second match, selecting a second reference data chunk for use in a third instance of the deduplication technique.

18. A method, comprising:
storing a plurality of comparison blocks in a memory of a non-volatile storage device in association with a first plurality of reference blocks;
storing a plurality of first candidate comparison blocks in a first auxiliary database of the non-volatile storage device in association with a second plurality of reference blocks;
storing a plurality of second candidate comparison blocks in a second auxiliary database of the non-volatile storage device in association with a third plurality of reference blocks;
ordering the memory, the first auxiliary database, and the second auxiliary database hierarchically;

receiving a set of data blocks; and performing a deduplication technique on a subset of data blocks in the set of data blocks that match one or more comparison blocks in the plurality of comparison blocks wherein a match between a data block and a comparison block is determined when at least 30% and less than 100% of fingerprints corresponding to the data block match fingerprints corresponding to the comparison block.

19. The method of claim 18, further comprising:

identifying an active set of comparison blocks in the plurality of comparison blocks;

comparing first data signatures of the data blocks and second data signatures of the comparison blocks to determine matched data signatures and unmatched data signatures;

creating first reference blocks for first data blocks pointing to first stored data blocks corresponding to the matched data signatures;

incrementing counters associated with comparison blocks in the active set of comparison blocks having the matched data signatures;

storing second data blocks corresponding to the unmatched data signatures; and creating a set of second candidate comparison blocks in the second auxiliary database corresponding to the stored second data blocks.

20. The method of claim 19, further comprising:

responsive to a counter associated with a second candidate comparison block in the set of second candidate comparison blocks exceeding a predetermined quantity, promoting the second candidate comparison block to a set of first candidate comparison blocks in the first auxiliary database.

21. The method of claim 20, wherein creating the set of second candidate comparison blocks comprises:

generating first fingerprints for the second candidate comparison blocks of the set; and generating second fingerprints for the first fingerprints as fingerprints of fingerprints (FOFs), the second data signatures including the FOFs, and the FOFs being utilized for comparing the second data signatures and the first data signatures to determine the matched data signatures and unmatched data signatures.

\* \* \* \* \*